US012485676B2

(12) United States Patent
Endo et al.

(10) Patent No.: US 12,485,676 B2
(45) Date of Patent: Dec. 2, 2025

(54) PRINTING DEVICE, INK SUPPLY DEVICE, PRINTING METHOD, AND INK SUPPLY METHOD

(71) Applicant: MIMAKI ENGINEERING CO., LTD., Nagano (JP)

(72) Inventors: Shin Endo, Nagano (JP); Shunsuke Akuta, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 110 days.

(21) Appl. No.: 18/571,248

(22) PCT Filed: Jun. 17, 2022

(86) PCT No.: PCT/JP2022/024311
§ 371 (c)(1),
(2) Date: Dec. 17, 2023

(87) PCT Pub. No.: WO2023/276725
PCT Pub. Date: Jan. 5, 2023

(65) Prior Publication Data

US 2024/0278581 A1 Aug. 22, 2024

(30) Foreign Application Priority Data

Jul. 1, 2021 (JP) ................................ 2021-110055
Jul. 1, 2021 (JP) ................................ 2021-110056

(51) Int. Cl.
*B41J 2/175* (2006.01)
*B41J 2/165* (2006.01)
(Continued)

(52) U.S. Cl.
CPC ......... *B41J 2/17566* (2013.01); *B41J 2/1652* (2013.01); *B41J 2/17563* (2013.01);
(Continued)

(58) Field of Classification Search
CPC .. B41J 2/17566; B41J 2/1652; B41J 2/17563; B41J 2/17596; B41J 2/18; B41J 2/2103;
(Continued)

(56) References Cited

U.S. PATENT DOCUMENTS

2020/0101749 A1* 4/2020 Horade ................ B41J 2/17523

FOREIGN PATENT DOCUMENTS

JP 2009220564 10/2009
JP 2009225564 10/2009
(Continued)

OTHER PUBLICATIONS

"International Search Report (Form PCT/ISA/210) of PCT/JP2022/024311", mailed on Aug. 30, 2022, with English translation thereof, pp. 1-4.

*Primary Examiner* — Justin Seo
(74) *Attorney, Agent, or Firm* — JCIPRNET

(57) ABSTRACT

The present invention more appropriately manages maintenance executed on an inkjet head. A printing device that performs printing through an inkjet method includes an inkjet head, a sub-tank 202, an ink amount detection unit, and a maintenance determination unit (maintenance controller). When the amount of ink in the sub-tank 202 is equal to or larger than a first threshold, the maintenance determination unit permits purge, which is an example of a normal maintenance, as maintenance to be executed on the inkjet head to which ink is supplied from the sub-tank 202. When the amount of ink in the sub-tank 202 is less than the first threshold, the maintenance determination unit prohibits purge and permits flushing, which is an example of low-consumption maintenance, as maintenance to be executed on the inkjet head to which ink is supplied from the sub-tank 202.

6 Claims, 6 Drawing Sheets

(51) Int. Cl.
*B41J 2/18* (2006.01)
*B41J 2/21* (2006.01)

(52) U.S. Cl.
CPC ............. *B41J 2/17596* (2013.01); *B41J 2/18* (2013.01); *B41J 2/2103* (2013.01); *B41J 2002/16573* (2013.01)

(58) Field of Classification Search
CPC .......... B41J 2002/16573; B41J 2/17509; B41J 29/46; B41J 2/01; B41J 2/165; B41J 2/175; B41J 2/195; B41J 2/21
See application file for complete search history.

(56) References Cited

FOREIGN PATENT DOCUMENTS

| | | |
|---|---|---|
| JP | 2009269291 | 11/2009 |
| JP | 2020055142 | 4/2020 |

* cited by examiner (a)

(b)

(a)

(b)

PRINTING DEVICE, INK SUPPLY DEVICE, PRINTING METHOD, AND INK SUPPLY METHOD

CROSS-REFERENCE TO RELATED APPLICATION

This application is a 371 application of the International PCT application serial no. PCT/JP2022/024311, filed on Jun. 17, 2022, which claims the priority benefits of Japan Patent Application No. 2021-110056, filed on Jul. 1, 2021, and Japan Patent Application No. 2021-110055, filed on Jul. 1, 2021. The entirety of each of the above-mentioned patent applications is hereby incorporated by reference herein and made a part of this specification.

TECHNICAL FIELD

The present invention relates to a printing device, an ink supply device, a printing method, and an ink supply method.

BACKGROUND ART

In recent years, an inkjet printer, which is a printing device that performs printing through an inkjet method, has been widely used (See, for example, Patent Literature 1). When carrying out printing using the inkjet head, it is usually necessary to periodically perform maintenance that consumes ink. On the other hand, Patent Literature 1 discloses performing a predetermined cleaning operation as a maintenance operation on the inkjet head. Patent Literature 1 discloses that a cleaning operation is enabled up to an ink end by detecting a remaining amount of ink in an ink cartridge by a predetermined method. Further, as a configuration of the inkjet printer, a configuration in which ink is supplied from an ink container such as an ink cartridge outside the inkjet head to the inkjet head is widely used (see, for example, Patent Literature 2).

CITATION LIST

Patent Literature

Patent Literature 1: Japanese Unexamined Patent Publication No. 2009-220564

Patent Literature 2: Japanese Unexamined Patent Publication No. 2009-225564

SUMMARY OF INVENTION

Technical Problems

In the inkjet printer, when the maintenance on the inkjet head is stopped, the failure of the inkjet head easily occurs as the drying of the ink in the vicinity of the nozzle progresses. Furthermore, in a case where printing is performed by long automatic operation (for example, overnight driving) in a state where a worker is not nearby, if the maintenance is canceled in the middle, it is considered that a time is required until the worker notices the cancellation, and thus a failure of the inkjet head is particularly likely to occur. Therefore, conventionally, a configuration capable of more appropriately managing the maintenance executed on the inkjet head has been desired. Therefore, an object of the present invention is to provide a printing device, an ink supply device, and a printing method that can solve the above problems.

Furthermore, when supplying ink from the ink container outside the inkjet head to the inkjet head, an abnormality may occur in the ink supply, and thus the operation of printing may be affected. On the other hand, Patent Literature 2 discloses that a threshold of the life of the filter is set by the value of the ink passage amount, and a notification is given to the user. According to such configuration, replacement of the filter can be urged before a defect due to clogging of the filter occurs.

However, it is conceivable that the timing at which an abnormality occurs in the supply of the ink variously changes due to the influence of the installation environment of the printing device, the variation in the characteristics of the ink due to the difference in the production lot of the ink, and the like. Therefore, conventionally, it has been desired to more flexibly cope with an abnormality in ink supply caused by clogging of the filter. Therefore, an object of the present invention is to provide a printing device, an ink supply device, and an ink supply method that can solve the above problems.

Solutions to Problems

The inventor of the present application conducted intensive research on a configuration that can more appropriately manage the maintenance to be executed on the inkjet head.

Furthermore, in this earnest research, in the configuration in which the sub-tank is provided between the ink container of the ink cartridge or the ink tank and the inkjet head, it has been considered to suppress the failure of the inkjet head as much as possible by continuing the executable maintenance based on the amount of ink in the sub-tank.

In such a configuration, when a sufficient amount of ink is stored in the ink container, the ink is continuously supplied to the sub-tank, so the amount of ink in the sub-tank is maintained at a predetermined amount at the normal time. However, when the ink in the ink container runs out and the ink cannot be supplied from the ink container to the sub-tank, the amount of ink in the sub-tank starts to decrease. In such a configuration, even when the supply of ink from the ink container to the sub-tank cannot be appropriately continued due to an abnormality generated in the ink flow path, the amount of ink in the sub-tank starts to decrease. Therefore, in such a configuration, by detecting that the amount of ink in the sub-tank starts to decrease, it is possible to detect that an abnormality related to the supply of ink occurs at the time when a certain amount of ink remains in the sub-tank.

Therefore, the inventor of the present application has considered detecting the occurrence of the abnormality related to the supply of ink based on the amount of ink in the sub-tank. Then, the inventor has considered switching the maintenance to be executed on the inkjet head to the maintenance with a small consumption amount of ink at the time of detecting an abnormality. According to such configuration, even if an abnormality occurs in the supply of ink from the ink container to the sub-tank, the maintenance on the inkjet head can be continued for a longer time.

In addition, the inventor of the present application has found features necessary for obtaining such effects through further intensive research, and has reached the present invention. In order to solve the above problems, the present invention is a printing device that performs printing through an inkjet method. The printing device includes: an inkjet head that ejects ink supplied from an ink container that stores ink; a sub-tank that is a container that stores ink in a middle of an ink supply path from the ink container to the inkjet head; an ink amount detection unit that detects an amount of ink stored in the sub-tank; and a maintenance determination unit that determines a type of maintenance to be executed on the inkjet head. A type of maintenance determined by the maintenance determination unit includes at least a normal maintenance which is a maintenance executed when no abnormality occurs in an amount of ink stored in the sub-tank, and a low-consumption maintenance which is a maintenance in which a consumption amount of ink is smaller than that at a time of executing the normal maintenance. When an amount of ink in the sub-tank detected by the ink amount detection unit is a first threshold or more, the maintenance determination unit permits the normal maintenance as maintenance to be executed on the inkjet head to which ink is supplied from the sub-tank. When an amount of ink in the sub-tank detected by the ink amount detection unit is smaller than the first threshold, the maintenance determination unit prohibits the normal maintenance and permits the low-consumption maintenance as maintenance to be executed on the inkjet head to which ink is supplied from the sub-tank.

According to such configuration, when the amount (remaining amount) of ink in the sub-tank becomes small, the maintenance on the inkjet head can be appropriately continued while suppressing the consumption amount of ink. Thus, the maintenance to be executed on the inkjet head can be more appropriately managed. The normal maintenance can be considered as maintenance executed only when the amount of ink in the sub-tank is sufficient. Continuing the maintenance on the inkjet head can be considered as performing the maintenance on the inkjet head at every predetermined timing. When the amount of ink in the sub-tank detected by the ink amount detection unit is the first threshold or more, the maintenance determination unit may permit the low-consumption maintenance in addition to the normal maintenance as maintenance to be executed on the inkjet head to which the ink is supplied from the sub-tank.

In this configuration, the printing device may include a plurality of inkjet heads that eject inks of different colors. In this case, the printing device includes a plurality of sub-tanks each of which stores the ink supplied to each of the inkjet heads. The ink amount detection unit detects the amount of ink stored in each sub-tank. Then, the maintenance determination unit determines the type of maintenance to be executed on the inkjet head to which ink is supplied from the sub-tank according to the amount of ink stored in each sub-tank. The maintenance determination unit thus determines whether to permit the normal maintenance of each inkjet head. According to such configuration, when the amount of ink decreases only in the sub-tank corresponding to some inkjet heads, the normal maintenance can be continuously executed for the other inkjet heads. Thus, the maintenance can be more appropriately executed for the plurality of inkjet heads.

Furthermore, in this configuration, the normal maintenance is a maintenance of performing purge of continuously ejecting ink from the nozzle of the inkjet head. The low-consumption maintenance is a maintenance that performs flushing to eject ink droplets from nozzles of an inkjet head. By performing such maintenance on the inkjet head, the failure of the inkjet head can be made less likely to occur. Furthermore, in this case, the amount of ink in the sub-tank becomes small, and the maintenance by flushing can be appropriately executed even for the inkjet head in which the purge is prohibited. Thus, even when an abnormality occurs in the supply of ink to the sub-tank, the failure of the inkjet head can be more appropriately prevented. Furthermore, in this case, in the configuration including the plurality of inkjet heads, even when the purge for the inkjet head receiving the ink supply from the sub-tank in which the amount of ink has decreased is prohibited, the purge can be continuously executed for the other inkjet heads. Thus, according to such configuration, the life of each nozzle of the plurality of inkjet heads of the printing device can be appropriately extended.

Furthermore, the type of maintenance determined by the maintenance determination unit may further include a non-consumption maintenance of performing maintenance of the inkjet head without consuming ink. In this case, when the amount of ink in the sub-tank detected by the ink amount detection unit is smaller than the first threshold and is equal to or larger than a second threshold smaller than the first threshold, the maintenance determination unit prohibits the normal maintenance and permits the low-consumption maintenance as maintenance to be executed on the inkjet head to which the ink is supplied from the sub-tank. When the amount of ink in the sub-tank detected by the ink amount detection unit is smaller than the second threshold, the maintenance determination unit prohibits the normal maintenance and the low-consumption maintenance and permits the non-consumption maintenance as maintenance to be executed on the inkjet head to which the ink is supplied from the sub-tank. According to such configuration, the executable maintenance can be appropriately continued for the inkjet head even when the ink in the sub-tank further decreases. Thus, the possibility of the inkjet head failing can be more appropriately reduced. As the non-consumption maintenance, it is conceivable to perform maintenance of wipe for wiping the nozzle surface of the inkjet head. In this case, it is preferable to perform the wipe using cleaning water or cleaning liquid.

Furthermore, in this configuration, it is conceivable that the ink amount detection unit further detects a supply abnormality, which is an abnormality in which the amount of ink supplied from the ink container to the sub-tank is insufficient. In this case, the ink amount detection unit detects the supply abnormality based on the amount of ink stored in the sub-tank. In this case, the maintenance determination unit may prohibit the normal maintenance as maintenance to be executed on the inkjet head to which the ink is supplied from the sub-tank in which the supply abnormality is detected. According to such configuration, it is possible to appropriately prevent the ink in the sub-tank from being greatly reduced by the normal maintenance being performed in the state of the supply abnormality.

Furthermore, in this configuration, the printing device may further include a supply flow path, a circulation flow path, a supply pump, a circulation pump, and a pump controller. In this case, the supply flow path is a flow path through which the ink supplied from the ink container to the sub-tank flows. The circulation flow path is a flow path through which the ink to be returned from the sub-tank to the ink container flows. The supply pump is a pump that causes the ink supplied from the ink container to the sub-tank to flow through the supply flow path. The circulation pump is a pump that causes the ink returned from the sub-tank to the ink container to flow through the circulation flow path. The pump controller controls the operations of the supply pump and the circulation pump based on the amount of ink detected by the ink amount detection unit. As the sub-tank, a container having a first ink storage portion and a second ink storage portion can be suitably used. In this case, the first ink storage portion is an ink storage portion connected to the ink container via the supply flow path. The second ink storage portion is an ink storage portion connected to the ink container via the circulation flow path. The second ink storage portion is partitioned from the first ink storage portion by a partition wall. In this case, the ink overflowing the partition wall is supplied from the first ink storage portion to the second ink storage portion.

Furthermore, in this case, it is conceivable that the ink amount detection unit detects a first storage amount which is the amount of ink stored in the first ink storage portion, and a second storage amount which is the amount of ink stored in the second ink storage portion. When the first storage amount is smaller than the first reference amount and the second storage amount is smaller than the second reference amount, the pump controller causes the supply pump and the circulation pump to perform an ink supply operation, which is an operation in which ink is supplied from the ink container to the sub-tank via the supply flow path and ink is not returned from the sub-tank to the ink container via the circulation flow path. Further, when the second storage amount does not become equal to or larger than the second reference amount even though the predetermined time elapses after the supply pump and the circulation pump start the ink supply operation, the ink amount detection unit determines that the supply abnormality occurs. According to such configuration, the supply abnormality can be appropriately detected.

Furthermore, as a configuration of the present invention, a configuration of an ink supply device and a printing method having the same features as described above can be considered. Also in these cases, the same effects as described above can be obtained.

The inventor of the present application has conducted intensive studies on a method of more flexibly responding to an abnormality in ink supply from an ink container to an inkjet head. Furthermore, in this research, a method of appropriately avoiding the occurrence of defects relating to the sub-tank provided between the ink container and the inkjet head has been studied. Then, focusing on the amount of ink flowing per unit time, which is the amount of ink flowing from the ink container to the sub-tank, the inventor has considered notifying an alarm when the ink flow amount changes. Furthermore, the inventor has considered performing the alarm notification stepwise according to the ink flow amount. According to such configuration, the notification to the user can be appropriately performed when an abnormality occurs in the supply of the ink from the ink container to the inkjet head. Furthermore, in this case, by performing a stepwise notification, the alarm notification according to the magnitude of the problem occurring can be performed. Furthermore, this makes it possible to evoke the user's response before a large problem occurs.

In addition, the inventor of the present application has found features necessary for obtaining such effects, and has reached the present invention. In order to solve the above problems, the present invention is a printing device that performs printing through an inkjet method. The printing device includes: an inkjet head that ejects ink supplied from an ink container that stores ink; a sub-tank that is a container that stores ink in a middle of an ink supply path from the ink container to the inkjet head; a liquid flow amount detection unit that detects an ink flow amount which is an amount of ink flowing per unit time from the ink container to the sub-tank; and a notification means configured to notify an alarm based on the ink flow amount detected by the liquid flow amount detection unit. The liquid flow amount detection unit causes the notification means to notify a stepwise alarm according to the detected ink flow amount.

When configured in such manner, the user can be flexibly and appropriately notified of the state of ink supply from the ink container to the sub-tank by notifying the alarm stepwise according to the ink flow amount. Thus, according to such configuration, the notification to the user can be appropriately performed when an abnormality occurs in the supply of the ink from the ink container to the inkjet head. Thus, it is possible to flexibly and appropriately cope with the abnormality of the ink supply.

In addition, in this case, by performing the stepwise notification, this makes it possible to notify an alarm according to the magnitude of the occurring problem and call for a user's response before a large problem occurs. In addition, as a result, before the printing device becomes inoperable, it is possible to more reliably and appropriately urge the user to take measures to avoid the occurrence of problems and to prevent the spread of damage. Furthermore, in this case, it is possible to appropriately prevent damage and spread of damage to the device related to the ink supply to the sub-tank. Therefore, according to such configuration, it is possible to appropriately prevent the occurrence of a defect related to the sub-tank.

In this configuration, the notification means performs notification of the alarm by using sound or light that is audible or visually appealing to the user by notification by voice or warning display on the display. In the notification means, notifying an alarm stepwise can be considered as notifying the alarm in at least two stages according to the ink flow amount. The notification means notifies, as a stepwise alarm, at least a first alarm indicating an abnormality of the ink flow amount in a state where the supply of the ink from the ink container to the sub-tank can be continued and a second alarm indicating that the ink flow amount is in a state where the supply of the ink from the ink container to the sub-tank is to be stopped according to the ink flow amount detected by the liquid flow amount detection unit. When the liquid flow amount detection unit determines that the ink flow amount is smaller than a first threshold, the liquid flow amount detection unit causes the notification means to notify the first alarm. Then, when it is determined that the ink flow amount is smaller than a second threshold smaller than the first threshold, the notification means is caused to notify a second alarm. According to such configuration, the stepwise alarm corresponding to the ink flow amount can be appropriately notified to the notification means. Furthermore, in this case, it is conceivable that the liquid flow amount detection unit causes the notification means to notify the first alarm when determining that the ink flow amount is smaller than the first threshold and equal to or larger than the second threshold.

Furthermore, in this configuration, the printing device performs printing using inks of a plurality of colors different from each other. In this case, the printing device includes an inkjet head and a sub-tank for each color of ink. In this case, the liquid flow amount detection unit detects the ink flow amount for each sub-tank (for each color of ink). Then, when an abnormality occurs in the ink flow amount corresponding to any of the sub-tanks, an alarm is generated in the notification means. In this case, in the liquid flow amount detection unit, it is conceivable to cause the notification means to generate an alarm associated with the sub-tank in which the abnormality occurs in the ink flow amount.

Furthermore, in this configuration, the printing device may circulate the ink between the ink container and the sub-tank. Furthermore, in this case, it is conceivable that the liquid flow amount detection unit detects the ink flow amount based on the amount of ink stored in the sub-tank.

In this case, the printing device further includes a supply flow path that is a flow path for flowing the ink supplied from the ink container to the sub-tank, a circulation flow path that is a flow path for flowing the ink returned from the sub-tank to the ink container, a supply pump that is a pump for causing the ink supplied from the ink container to the sub-tank to flow through the supply flow path, a circulation pump that is a pump for causing the ink returned from the sub-tank to the ink container to flow through the circulation flow path, and an ink amount detection unit that detects the amount of ink stored in the sub-tank. The liquid flow amount detection unit detects the ink flow amount based on the operation states of the supply pump and the circulation pump and the amount of ink in the sub-tank detected by the ink amount detection unit. According to such configuration, the ink flow amount can be appropriately detected.

As the sub-tank, it is conceivable to use a configuration including a first ink storage portion which is an ink storage portion connected to the ink container through the supply flow path, and a second ink storage portion which is an ink storage portion connected to the ink container through the circulation flow path. In this case, the second ink storage portion is partitioned from the first ink storage portion by the partition wall. Then, the ink overflowing the partition wall is supplied from the first ink storage portion to the second ink storage portion.

Furthermore, the printing device may further include a pump controller that controls the operations of the supply pump and the circulation pump based on the amount of ink in the sub-tank detected by the ink amount detection unit. In this case, the ink amount detection unit detects a first storage amount which is the amount of ink stored in the first ink storage portion, and a second storage amount which is the amount of ink stored in the second ink storage portion. When the first storage amount is smaller than the first reference amount and the second storage amount is smaller than the second reference amount, the pump controller causes the supply pump and the circulation pump to perform an ink supply operation, which is an operation in which ink is supplied from the ink container to the sub-tank via the supply flow path and ink is not returned from the sub-tank to the ink container via the circulation flow path. According to such configuration, when the amount of ink in the sub-tank decreases, the ink can be appropriately supplied from the ink container to the sub-tank.

When the second storage amount does not become equal to or larger than the second reference amount even though the first time elapses after the supply pump and the circulation pump start the ink supply operation, the liquid flow amount detection unit determines that the ink flow amount is smaller than the first threshold. Furthermore, when the second storage amount does not become equal to or larger than the second reference amount even though the second time longer than the first time elapses after the supply pump and the circulation pump start the ink supply operation, the liquid flow amount detection unit determines that the ink flow amount is less than the second threshold smaller than the first threshold. According to such configuration, the detection of the ink flow amount can be appropriately performed.

Furthermore, in this configuration, the liquid flow amount detection unit may detect the occurrence of an abnormality of the ink flow amount based on the history of the ink flow amount in which the past ink flow amount is recorded. According to such configuration, the abnormality of the ink flow amount can be more appropriately detected. In this case, it is conceivable that the liquid flow amount detection unit compares the initial value of the ink flow amount with the current ink flow amount, and detects an abnormality in the ink flow amount based on a change in the ink flow amount in time series.

Furthermore, in this configuration, the printing device may further include a filter that passes the ink in a flow path through which the ink supplied from the ink container to the sub-tank flows. In this case, the liquid flow amount detection unit detects the presence or absence of an abnormality in the ink flow amount. When the liquid flow amount detection unit detects that the ink flow amount is abnormal, it is conceivable to reduce the amount of ink supplied from the ink container to the sub-tank to reduce the flow rate of ink passing through the filter. According to such configuration, when an abnormality in the ink flow amount occurs due to clogging of the filter or the like, an amount of ink that cannot pass through the filter can be appropriately prevented from being supplied to the filter.

Furthermore, in a case where the printing device includes the supply flow path and the circulation flow path, it is conceivable to stop the operation of returning the ink from the sub-tank to the ink container via the circulation flow path when the liquid flow amount detection unit detects that the ink flow amount is abnormal. According to such configuration, when the amount of ink supplied from the ink container to the sub-tank decreases, it is possible to appropriately prevent the ink in the sub-tank from losing in a short time. Furthermore, when liquid flow amount detection unit detects that the ink flow amount is abnormal, it is conceivable to stop the operation of causing the inkjet head to eject ink. According to such configuration, it is possible to appropriately prevent the inkjet head and the printing device from failing by continuing the printing operation in the state where the abnormality of the ink flow amount occurs.

Furthermore, as the configuration of the present invention, a configuration of an ink supply device and an ink supply method having the same features as described above can be considered. Also in these cases, the same effects as described above can be obtained.

Effect of the Invention

According to the present invention, the maintenance executed on the inkjet head can be more appropriately managed.

Furthermore, according to the present invention, it is possible to flexibly and appropriately cope with the abnormality of the ink supply.

DESCRIPTION OF EMBODIMENTS

Figure 1:
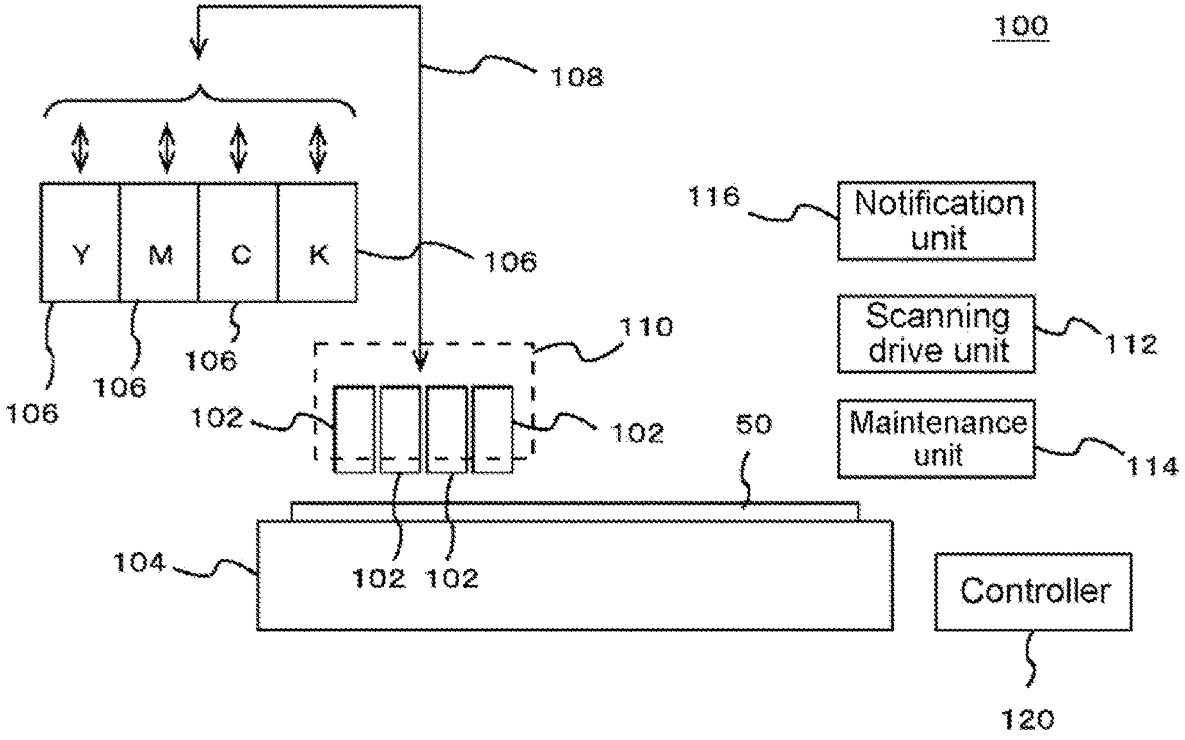
FIG. 1 is a view showing one example of a configuration of a main part of a printing device 100 according to one embodiment of the present invention.

Hereinafter, an embodiment according to the present invention will be described with reference to the drawings. FIG. 1 shows an example of a configuration of a main part of a printing device 100 according to an embodiment of the present invention. In the present example, the printing device 100 is an inkjet printer that performs printing through an inkjet method on a medium (media) 50 to be printed, and includes a plurality of inkjet heads 102, a platen 104, a plurality of main tanks 106, an ink supply system 108, a carriage 110, a scanning drive unit 112, a maintenance unit 114, a notification unit 116, and a controller 120. Other than the points described below, the printing device 100 may have features same as or similar to known inkjet printers. For example, in addition to the configuration illustrated in FIG. 1, the printing device 100 may further include a configuration same as or similar to a known inkjet printer.

Furthermore, in the present example, the printing device 100 is also an example of an ink supply device that supplies ink from the main tank 106 to the inkjet head 102.

The plurality of inkjet heads 102 are ejection heads that eject ink supplied from the plurality of main tanks 106 via the ink supply system 108 to the medium 50. In the present example, each of the plurality of inkjet heads 102 ejects inks of different colors. Furthermore, each inkjet head 102 includes a plurality of nozzles, and ejects ink from each nozzle according to an image to be printed. The platen 104 is a table-shaped member that holds the medium 50 so as to face the plurality of inkjet heads 102.

The plurality of main tanks 106 are ink containers that store ink to be supplied to the plurality of inkjet heads 102. Furthermore, in the present example, each of the plurality of main tanks 106 stores ink of different colors, and supplies the ink to any one of the inkjet heads 102 via the ink supply system 108. As the main tank 106, an ink bottle or an ink cartridge can be suitably used. Furthermore, in the present example, an ink container capable of replenishing ink is used as the main tank 106. In this case, it is conceivable to perform the replenishment of the ink to the ink supply system 108 in a state where the main tank 106 is installed in the printing device 100. Consideration is also made to using a replaceable ink container detached from the printing device 100 as the main tank 106. In this case, the main tank 106 can also be considered as a member other than the components of the printing device 100.

The ink supply system 108 is configured to include an ink supply path for supplying ink from the plurality of main tanks 106 to the plurality of inkjet heads 102. In the present example, the ink supply system 108 includes a sub-tank that stores ink between the main tank 106 and the inkjet head 102, a filter that passes ink supplied from the main tank 106 to the sub-tank, and the like. A more specific configuration of the ink supply system 108 will be described in more detail later. The carriage 110 is a holding member that holds the plurality of inkjet heads 102.

Furthermore, in the present example, the carriage 110 holds a part of the ink supply system 108 together with the plurality of inkjet heads 102. In the present example, the carriage 110 holds a sub-tank and the like in the ink supply system 108. According to such configuration, the sub-tank can be appropriately installed in the vicinity of the inkjet head 102.

The scanning drive unit 112 is a drive unit that causes the plurality of inkjet heads 102 to perform a scanning operation of relatively moving with respect to the medium 50. In the present example, the scanning drive unit 112 causes the plurality of inkjet heads 102 to carry out a main scanning operation and a sub-scanning operation. In this case, the main scanning operation can be considered as an operation of ejecting the ink while relatively moving with respect to the medium 50 in a predetermined main scanning direction. In the main scanning operation, the scanning drive unit 112 causes the plurality of inkjet heads 102 to eject ink to an ink ejection position selected according to an image to be printed. The sub-scanning operation can be considered as an operation of relatively moving with respect to the medium 50 in the sub-scanning direction orthogonal to the main scanning direction. The scanning drive unit 112 changes the range facing the plurality of inkjet heads 102 in the medium 50 by causing the plurality of inkjet heads 102 to perform the sub-scanning operation between the main scanning operations. Thus, the scanning drive unit 112 causes the plurality of inkjet heads 102 to eject the ink to each position of the medium 50.

The maintenance unit 114 is configured to execute maintenance operation on the plurality of inkjet heads 102. In the present example, the maintenance unit 114 executes maintenance such as purge, flushing, wipe (cleaning water wipe), and the like on the plurality of inkjet heads 102 at a predetermined timing during the printing operation (drawing). Execution of maintenance on the inkjet head 102 can also be considered as execution of maintenance on a nozzle group including a plurality of nozzles of the inkjet head 102. The maintenance operation performed by the maintenance unit 114 will be described later in further detail.

The notification unit 116 is configured to notify the user of the printing device 100 of various types of information. In the present example, the notification unit 116 is an example of a notification means, and performs notification of an alarm using sound or light appealing to the user's hearing or vision by notification by voice or warning display on a display. In this case, it is conceivable that the speaker and the display in the printing device 100 correspond to the notification unit 116. Furthermore, in the present example, the notification unit 116 notifies an alarm regarding an abnormality in the supply of the ink supplied from the main tank 106 to the sub-tank of the ink supply system 108. In this case, the notification unit 116 notifies the alarm in a plurality of stages for each sub-tank corresponding to each of the plurality of inkjet heads 102. An example of the alarm notified by the notification unit 116 will be described in more detail later.

The controller 120 is a part including a CPU and the like of the printing device 100, and controls the operation of each unit of the printing device 100 according to a program (firmware and the like) that controls the operation of the printing device 100. In this case, it is conceivable that the operation of the controller 120 is realized by the CPU or the like having various functional configurations according to the program. Furthermore, the controller 120 may have a configuration or the like corresponding to a controller in the printing device 100. The functional configuration of the controller 120 will be described in more detail later.

Figure 2:
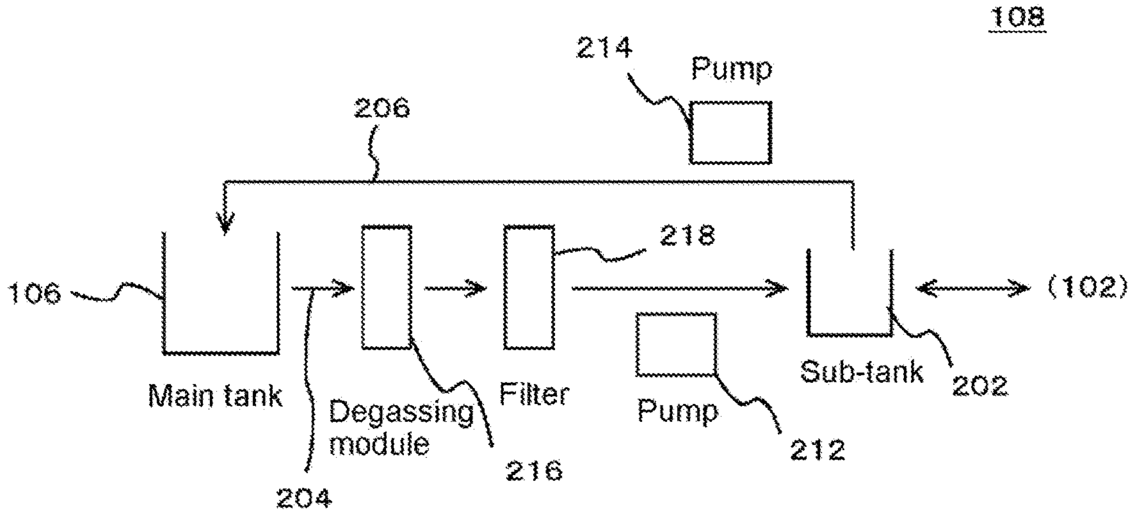
FIG. 2 is a view describing a more specific configuration of an ink supply system 108. (a) of FIG. 2 shows an example of a configuration of the ink supply system 108. (b) of FIG. 2 shows an example of a configuration of a sub-tank 202 in the ink supply system 108.
Figure 2:
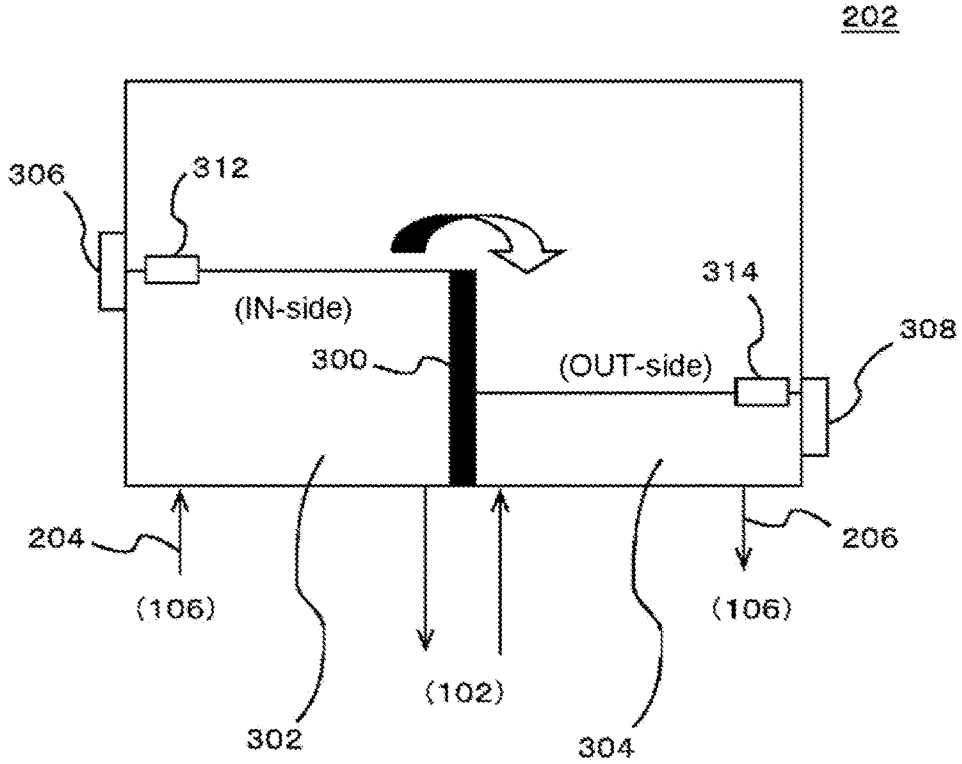

Next, a more specific configuration of the ink supply system 108 in the printing device 100 will be described in more detail. FIG. 2 is a view describing a more specific configuration of the ink supply system 108. (a) of FIG. 2 is a view showing an example of a configuration of the ink supply system 108, and shows an example of a configuration for supplying ink from the main tank 106 to the inkjet head 102 for one of the plurality of inkjet heads 102 in the printing device 100. In the present example, the ink supply system 108 includes a sub-tank 202, a supply flow path 204, a circulation flow path 206, a plurality of pumps 212 and 214, a degassing module 216, and a filter 218 corresponding to one inkjet head 102. Furthermore, in this case, the ink supply system 108 has these configurations corresponding to each inkjet head 102. In this case, the printing device 100 can be considered to have each configuration of the sub-tank 202, the supply flow path 204, the circulation flow path 206, and the like for each color of ink.

The sub-tank 202 is an ink container that stores ink in the middle of the ink supply path from the main tank 106 to the inkjet head 102. In the present example, the sub-tank 202 is held by the carriage 110 (see FIG. 1) together with the inkjet head 102, so that the ink is stored in a smaller volume than the main tank 106 in the vicinity of the inkjet head 102. In addition, the pressure inside the sub-tank 202 is adjusted to a pressure that becomes a negative pressure with respect to the atmospheric pressure by an adjustment mechanism not illustrated in (a) of FIG. 2. By thus adjusting the pressure inside the sub-tank 202 and supplying the ink to the inkjet head 102, the ink can be appropriately prevented from leaking out from the nozzles of the inkjet head 102.

Furthermore, in a modification of the ink supply system 108, the space inside the sub-tank 202 may be released to the atmosphere. In this case, the pressure inside the sub-tank 202 can be considered to be a pressure that is balanced with the atmospheric pressure. Furthermore, in this case, a pressure adjusting unit (for example, a pressure damper) that adjusts the supply pressure of the ink to the inkjet head 102 may be further provided between the sub-tank 202 and the inkjet head 102. The pressure adjusting unit adjusts the pressure of the ink supplied to the inkjet head 102 to a pressure that becomes a negative pressure with respect to the atmospheric pressure by lowering the pressure of the ink supplied from the sub-tank 202 to a supply pressure corresponding to the atmospheric pressure by a predetermined adjustment amount. When configured in such manner as well, the ink can be appropriately supplied to the inkjet head 102.

The supply flow path 204 is a flow path through which the ink supplied from the main tank 106 to the sub-tank 202 flows. As the supply flow path 204, a tube through which ink passes can be suitably used. In the present example, as shown in the drawing, the supply flow path 204 causes ink to flow from the main tank 106 toward the sub-tank 202 via the degassing module 216 and the filter 218. The circulation flow path 206 is an ink flow path for circulating ink between the main tank 106 and the sub-tank 202, and allows ink to flow in a path different from the supply flow path 204 so as to return the ink from the sub-tank 202 to the main tank 106. As the circulation flow path 206, a tube through which ink passes can be suitably used. The pump 212 is an example of a supply pump, and causes ink supplied from the main tank 106 to the sub-tank 202 to flow into the supply flow path 204. The pump 214 is an example of a circulation pump, and causes ink returned from the sub-tank 202 to the main tank 106 to flow to the circulation flow path 206. As the pump 212 and the pump 214, known tube pumps can be suitably used.

The degassing module 216 is configured to remove air in the ink, and is installed in the middle of the supply flow path 204 to degas the ink supplied from the main tank 106 to the sub-tank 202. The filter 218 is a configuration for removing foreign substances and hardened ink in the ink, and is installed in the middle of the supply flow path 204 to remove foreign substances from the ink supplied from the main tank 106 to the sub-tank 202. When configured in such manner, the ink in a state suitable for ejecting the ink from the inkjet head 102 can be appropriately supplied to the sub-tank 202 by supplying ink from the main tank 106 to the sub-tank 202 via the degassing module 216 and the filter 218. In this case, by returning the ink from the sub-tank 202 to the main tank 106 via the circulation flow path 206 and circulating the ink, it is possible to appropriately prevent an excessive time from passing after the ink in the sub-tank 202 passes through the degassing module 216 and the filter 218. Therefore, according to the present example, the ink in a state suitable for ejecting the ink can be more appropriately supplied to the inkjet head 102.

Here, in the present example, the controller 120 (see FIG. 1) of the printing device 100 controls the supply of ink from the main tank 106 to the sub-tank 202 and the circulation of ink based on the amount of ink stored in the sub-tank 202. The sub-tank 202 has a preferable configuration in the case of performing such control. In the present example, as illustrated in (b) of FIG. 2, the sub-tank 202 includes a partition wall 300, an IN-side storage portion 302, an OUT-side storage portion 304, and a plurality of liquid level detection sensors 306 and 308. (b) of FIG. 2 shows an example of a configuration of a sub-tank 202 in the ink supply system 108.

The partition wall 300 is a wall that partitions the IN-side storage portion 302 and the OUT-side storage portion 304. Furthermore, in the present example, the partition wall 300 partitions the IN-side storage portion 302 and the OUT-side storage portion 304 such that the overflowed ink flows from the IN-side storage portion 302 to the OUT-side storage portion 304 when the position of the liquid level of the ink stored in the IN-side storage portion 302 exceeds a predetermined height. The IN-side storage portion 302 is an example of a first ink storage portion, and stores the ink supplied from the main tank 106 to the sub-tank 202 by being connected to the main tank 106 via the supply flow path 204. The OUT-side storage portion 304 is an example of a second ink storage portion, and is connected to the main tank 106 via the circulation flow path 206 to store the ink to be sent out to the main tank 106 at the time of ink circulation.

The liquid level detection sensor 306 is a sensor that detects the position of the liquid level of the ink in the IN-side storage portion 302, and detects the position of the liquid level based on the position (height) of a float 312 floating on the ink in the IN-side storage portion 302. In the present example, as shown in the drawing, the liquid level detection sensor 306 detects the position of the liquid level of the ink in the IN-side storage portion 302 in the vicinity of the position corresponding to the height of the partition wall 300. In this case, the height of the partition wall 300 can be considered as a height at which the overflow of the ink beyond the partition wall 300 occurs. Thus, the liquid level detection sensor 306 detects the position of the liquid level indicating whether the ink of the amount in which the ink can be supplied from the IN-side storage portion 302 to the OUT-side storage portion 304 is stored in the IN-side storage portion 302. The liquid level detection sensor 308 is a sensor that detects the position of the liquid level of the ink in the OUT-side storage portion 304, and detects the position of the liquid level based on the position (height) of a float 314 floating on the ink in the OUT-side storage portion 304. In the present example, as shown in the drawing, the liquid level detection sensor 308 detects the position of the liquid level of the ink in the OUT-side storage portion 304 at a position lower than the height of the partition wall 300. In this case, the liquid level detection sensor 308 detects the position of the liquid level indicating whether the amount of ink to be subjected to the circulating operation of returning the ink to the main tank 106 is stored in the OUT-side storage portion 304. As the liquid level detection sensors 306 and 308, it is preferable to use a sensor capable of detecting the position of the liquid level in a plurality of stages. As such a sensor, for example, a known three-point liquid level sensor or the like can be suitably used.

With the above configuration, in the sub-tank 202 of the present example, the ink supplied from the main tank 106 is first supplied into the IN-side storage portion 302. When a sufficient amount of ink is stored in the IN-side storage portion 302 and the position of the liquid level exceeds the height of the partition wall 300, the ink overflowing the partition wall 300 is supplied from the IN-side storage portion 302 to the OUT-side storage portion 304. Then, when a predetermined amount or more of ink is stored in the OUT-side storage portion 304, the ink in the OUT-side storage portion 304 is returned to the main tank 106 via the circulation flow path 206. According to the present example, the ink can be appropriately supplied from the main tank 106 to the sub-tank 202, and the ink can be appropriately circulated between the main tank 106 and the sub-tank 202.

Here, in the present example, the ink is also circulated between the inkjet head 102 and the sub-tank 202. In this case, the ink is supplied from the sub-tank 202 to the inkjet head 102 from the IN-side storage portion 302 side as shown in the drawing. Furthermore, the ink returning from the inkjet head 102 is received on the OUT-side storage portion 304 side.

Therefore, in the present example, the ink is supplied from the IN-side storage portion 302 to the OUT-side storage portion 304 in a path through the inkjet head 102 in addition to a path in which the partition wall 300 overflows. Furthermore, in the present example, the amount of ink in the sub-tank 202 is detected by the plurality of liquid level detection sensors 306 and 308 in the sub-tank 202, and the controller 120 controls the operation of the plurality of pumps 212 and 214 and the like based on the result, thereby controlling the ink supply and the circulating operation. Hereinafter, the functional configuration of the controller 120 and the control of ink supply and circulation performed in the controller 120 will be described in more detail.

Figure 3:
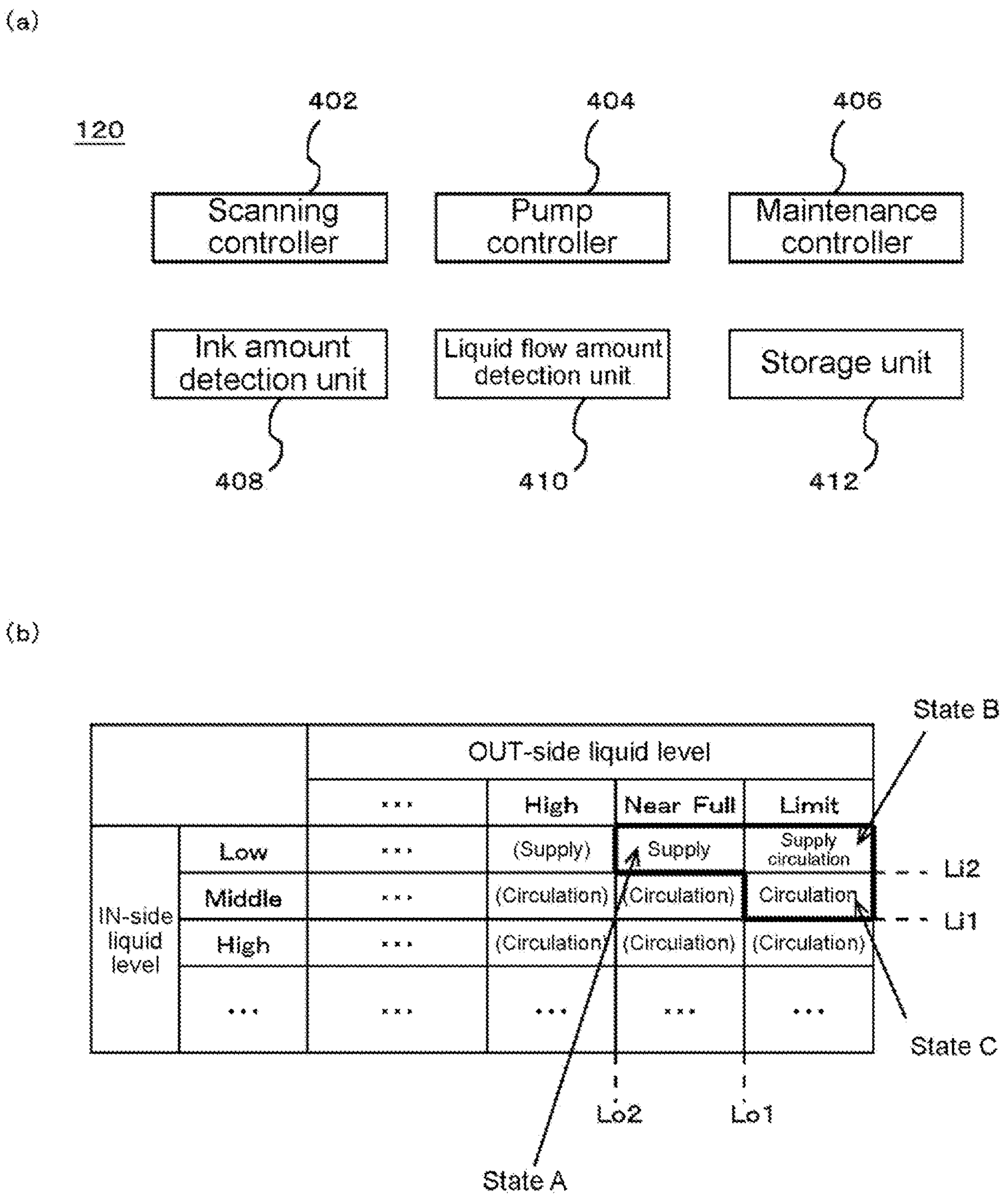
FIG. 3 is a view describing control performed by a controller 120 in more detail. (a) of FIG. 3 illustrates an example of a functional configuration of the controller 120. (b) of FIG. 3 illustrates an example of control performed by a pump controller 404.

FIG. 3 is a view describing the control performed by the controller 120 in more detail. (a) of FIG. 3 is a diagram showing an example of a functional configuration of the controller 120, and shows an example of a configuration of the controller 120 using functional blocks showing control performed in the controller 120. (b) of FIG. 3 illustrates an example of control performed by a pump controller 404.

In the present example, the controller 120 functionally includes a scanning controller 402, a pump controller 404, a maintenance controller 406, an ink amount detection unit 408, a liquid flow amount detection unit 410, and a storage unit 412. In this case, it is conceivable that at least a part of the controller 120 functions as various functional configurations. In this case, the CPU or the like included in the controller 120 operates according to a program such as firmware, thereby functioning as the scanning controller 402, the pump controller 404, the maintenance controller 406, the ink amount detection unit 408, and the liquid flow amount detection unit 410. In addition, a CPU or the like included in the controller 120 functions as the storage unit 412 together with a storage means such as a memory or a storage. In addition to the above configuration, the controller 120 may further have another functional configuration according to the operation and the like executed by the printing device 100.

Furthermore, among these configurations, the scanning controller 402 performs control related to the main scanning operation and the sub-scanning operation executed in the printing device 100. The pump controller 404 controls the operation of the pumps 212 and 214 (see FIG. 2) in the ink supply system 108. Furthermore, in the present example, the pump controller 404 controls the operations of the pumps 212 and 214 based on the amount of ink in the sub-tank 202 (see FIG. 2) detected by the ink amount detection unit 408. The maintenance controller 406 performs control related to a maintenance operation executed in the maintenance unit 114 (see FIG. 1). Furthermore, in the present example, the maintenance controller 406 is an example of a maintenance determination unit, and determines the type of maintenance to be executed on the inkjet head 102 in the maintenance unit 114 according to the amount of ink stored in the sub-tank 202. The operation of determining the type of maintenance in the maintenance controller 406 will be described later in further detail together with the type of maintenance executed in the maintenance unit 114 and the like.

The ink amount detection unit 408 detects the amount of ink stored in the sub-tank 202. In the present example, the ink amount detection unit 408 detects a first storage amount, which is the amount of ink stored in the IN-side storage portion 302 (see FIG. 2), based on the output of the liquid level detection sensor 306 (see FIG. 2) in the sub-tank 202. Furthermore, a second storage amount, which is the amount of ink stored in the OUT-side storage portion 304 (see FIG. 2), is detected based on the output of the liquid level detection sensor 308 (see FIG. 2) in the sub-tank 202. The ink amount detection unit 408 can be considered as an example of a means that detects the remaining amount of ink in each sub-tank 202. Furthermore, in the present example, the ink amount detection unit 408 can be considered as a determination means that determines whether the remaining amount of ink in each sub-tank 202 is less than a predetermined threshold. In addition, the liquid level detection sensors 306 and 308 can be considered as a configuration outside the controller 120. In a case where the configuration of the printing device 100 and the part considered as the controller 120 are made different, the liquid level detection sensors 306 and 308 can also be considered as configurations included in the controller 120. In this case, it is conceivable that the controller 120 functions as the ink amount detection unit 408 together with the liquid level detection sensors 306 and 308.

The liquid flow amount detection unit 410 detects an ink flow amount which is an amount of ink flowing per unit time from the main tank 106 (see FIG. 1) to the sub-tank 202. In the present example, the liquid flow amount detection unit 410 detects the ink flow amount based on the operation states of the pumps 212 and 214 controlled by the pump controller 404 and the first storage amount and the second storage amount detected by the ink amount detection unit 408. Furthermore, the liquid flow amount detection unit 410 further determines the presence or absence of an abnormality in the ink flow amount, and causes the notification unit 116 (see FIG. 1) to notify an alarm when the abnormality occurs. The liquid flow amount detection unit 410 can also be considered as an example of a determination means that determines the presence or absence of an abnormality in the ink flow amount. A method of detecting the ink flow amount in the liquid flow amount detection unit 410, an operation of causing the notification unit 116 to notify an alarm, and the like will be described in more detail later. The storage unit 412 stores and manages parameters used for control performed by the controller 120. Furthermore, in the present example, the storage unit 412 stores a history of the ink flow amount in which the past ink flow amount has been recorded. How to use the history of the ink flow amount will also be described in more detail later.

Next, as an example of control executed in the controller 120, control of the operation of the pump performed in the pump controller 404 will be described. In the following description, the operation of the functional configuration of the controller 120 of the pump controller 404 will be simply described as the operation of the configuration. As described above, in the present example, the pump controller 404 controls the operations of the pumps 212 and 214 in the ink supply system 108 based on the first storage amount and the second storage amount that are the amount of ink in the sub-tank 202 detected by the ink amount detection unit 408.

In the present example, the ink amount detection unit 408 detects which of the five stages of Low, Middle, High, Near Full, and Limit the first storage amount corresponds to, in association with the position of the liquid level (IN-side liquid level) in the IN-side storage portion 302. Similarly, it is detected whether the second storage amount corresponds to any of the five stages of Low, Middle, High, Near Full, and Limit in association with the position of the liquid level (OUT-side liquid level) in the OUT-side storage portion 304. In this case, Low indicates a state in which the storage amount is the smallest, and the storage amount increases in the order of Middle, High, Near Full, and Limit. In addition, the storage amount determined to correspond to each stage is individually set for each of the liquid level detection sensor 306 and the liquid level detection sensor 308 according to the attachment height of each of the liquid level detection sensor 306 and the liquid level detection sensor 308. The ink amount detection unit 408 detects the first storage amount based on a plurality of reference amounts set according to positions of a plurality of mutually different liquid levels close to the height of the partition wall 300 (see FIG. 2) partitioning between the IN-side storage portion 302 and the OUT-side storage portion 304. Furthermore, the ink amount detection unit 408 detects the second storage amount based on a plurality of reference amounts set according to positions of a plurality of mutually different liquid levels at a predetermined position lower than the height of the partition wall 300.

Furthermore, in the present example, the pump controller 404 causes the pumps 212 and 214 to perform any operation selected from the ink supply operation, the ink supply circulation operation, and the ink circulation operation according to the first storage amount and the second storage amount. In this case, the ink supply operation is an operation in which ink is supplied from the main tank 106 to the sub-tank 202 through the supply flow path 204 (see FIG. 2), and the ink is not returned from the sub-tank 202 to the main tank 106 via the circulation flow path 206 (see FIG. 2). The ink supply circulation operation is an operation in which ink is supplied from the main tank 106 to the sub-tank 202 via the supply flow path 204, and ink is returned from the sub-tank 202 to the main tank 106 via the circulation flow path 206. The ink circulation operation is an operation in which ink is not supplied from the main tank 106 to the sub-tank 202 via the supply flow path 204, and the ink is returned from the sub-tank 202 to the main tank 106 via the circulation flow path 206.

Furthermore, the pump controller 404 adjusts the amount of ink stored in each of the IN-side storage portion 302 and the OUT-side storage portion 304 to become any of the states A, B, and C illustrated in (b) of FIG. 3 by causing the pumps 212 and 214 to perform these operations. In this case, the states A, B, and C are states determined according to the magnitude relationship between reference amounts Li1 and Li2 and the first storage amount and the magnitude relationship between reference amounts Lo1 and Lo2 and the second storage amount shown in the drawing. In the present example, the reference amount Li2 is an example of a first reference amount. The reference amount Lo1 is an example of a second reference amount. The state A can be considered as a state in which the first storage amount is smaller than the reference amount Li2 and the second storage amount is smaller than the reference amount Lo1. In the case shown in the drawing, the second storage amount in the state A is smaller than the reference amount Lo1 and is equal to or larger than the reference amount Lo2. The state B can be considered as a state in which the first storage amount is smaller than the reference amount Li2 and the second storage amount is equal to or larger than the reference amount Lo1. The state C can be considered as a state in which the first storage amount is equal to or larger than the reference amount Li2 and the second storage amount is equal to or larger than the reference amount Lo1. In the case shown in the drawing, the first storage amount in the state C is equal to or larger than the reference amount Li2 and is less than the reference amount Li1.

When the storage amount of ink in the sub-tank 202 is in the state A, the pump controller 404 causes the pumps 212 and 214 to perform the ink supply operation. Furthermore, when the storage amount of ink is in the state B, the pump controller 404 causes the pumps 212 and 214 to perform the ink supply circulation operation. When the ink storage amount is in the state C, the pump controller 404 causes the pumps 212 and 214 to perform the ink circulation operation. By controlling these operations, the pump controller 404 causes the state of the storage amount of ink in the sub-tank 202 to transition among the states A, B, and C. According to such configuration, when the amount of ink in the sub-tank 202 decreases, the ink can be appropriately supplied from the main tank 106 to the sub-tank 202. Furthermore, when sufficient ink is stored in the sub-tank 202, the ink can be appropriately circulated between the main tank 106 and the sub-tank 202 by returning the ink from the sub-tank 202 to the main tank 106.

Here, in the present example, in order to appropriately secure the ink supply performance, the performance of the pump 212 for supplying ink is made larger than the performance of the pump 214 for circulation. Therefore, during normal operation, transition occurs mainly between the states B and C among the states A, B, and C. Furthermore, in this case, at the timing when the consumption amount of ink increases, the ink in the sub-tank 202 decreases and the state transitions to the state A, so the ink can be more appropriately supplied to the sub-tank 202. Thus, as described above, the transition among the states A, B, and C is maintained with respect to the storage amount of the ink in the sub-tank 202.

Furthermore, when the consumption amount of ink temporarily greatly changes, or when an abnormality occurs in the supply and circulation of ink, the storage amount of ink in the sub-tank 202 may be in a state other than the states A, B, and C. Therefore, in the present example, as shown in parentheses in the drawing, the ink supply operation, the ink supply circulation operation, or the ink circulation operation is associated with states other than the states A, B, and C. In this case, operations other than these may be associated with some states. Furthermore, it is conceivable to store such association between the state and the operation in the storage unit 412 in the form of a control table. In this case, regarding the operation of the pump controller 404, it is conceivable that the operations of the pumps 212 and 214 are controlled according to the control table stored in the storage unit 412. According to the present example, the supply of ink to the sub-tank 202 and the circulation of ink can be appropriately executed.

Figure 4:
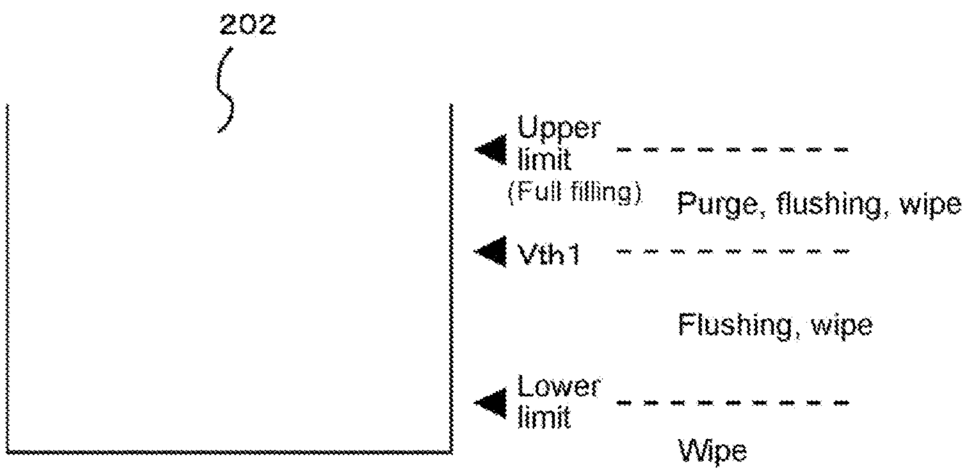
FIG. 4 is a view describing a type of maintenance executed in a maintenance unit 114. (a) of FIG. 4 illustrates a simplified relationship between the type of maintenance and the amount of ink stored in the sub-tank 202. (b) of FIG. 4 shows an example of a normal state in which a sufficient amount of ink is stored in the sub-tank 202.
Figure 4:
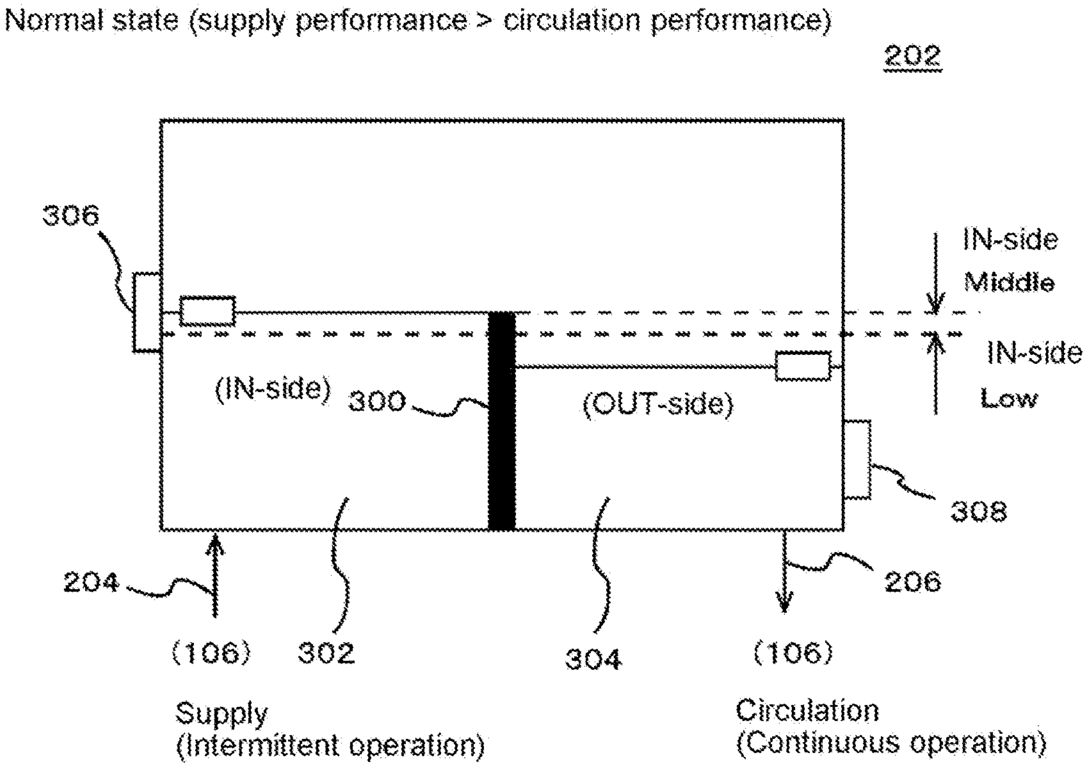

Next, the operation of the maintenance controller 406 determining the type of maintenance to be executed in the maintenance unit 114 and the type of maintenance to be executed by the maintenance unit 114 will be described in more detail. FIG. 4 is a diagram describing types of maintenance executed in the maintenance unit 114. (a) of FIG. 4 illustrates a simplified relationship between the type of maintenance and the amount (remaining amount) of ink stored in the sub-tank 202.

As described above, the maintenance controller 406 determines the type of maintenance to be executed on the inkjet head 102 (see FIG. 1) in the maintenance unit 114 according to the amount of ink stored in the sub-tank 202. In the present example, the type of maintenance determined by the maintenance controller 406 includes purge, flushing, and wipe, as illustrated in the drawing. In this case, the purge is an example of normal maintenance which is maintenance executed when no abnormality occurs in the amount of ink stored in the sub-tank 202. Flushing is an example of low-consumption maintenance which is maintenance in which the consumption amount of ink is smaller than that at the time of performing normal maintenance. The wipe is an example of non-consumption maintenance of performing maintenance of the inkjet head 102 without consuming ink.

Furthermore, the purge can be considered as maintenance of continuously ejecting the ink from the nozzle of the inkjet head 102. During normal operation (during printing operation), as described above, it is conceivable to adjust the pressure of the ink supplied to the inkjet head 102 to a pressure that becomes a negative pressure with respect to the atmospheric pressure. According to such configuration, the ink can be appropriately prevented from leaking out from the nozzle of the inkjet head 102. On the other hand, at the time of executing the purge, the maintenance unit 114 supplies the pressurized ink to the nozzles of the inkjet head 102, thereby intentionally applying pressure to discharge the ink from the nozzles. The purge can also be considered as maintenance in which ink is continuously pushed out from each nozzle like a shower. By performing the purge, particularly ink that cannot be discharged by flushing described below, such as ink having high viscosity or ink containing bubbles, can be appropriately discharged from the nozzle. In addition, by performing the purge, the clogged nozzle may be recovered.

The flushing can be considered as maintenance of ejecting ink droplets from the nozzles of the inkjet head 102. In this case, ejecting the ink droplets from the nozzle can be considered as ejecting the ink droplets of a predetermined volume from the nozzle a predetermined number of times instead of continuously discharging the ink like in the purge. The flushing can be considered as an operation of driving the inkjet head 102 to eject ink from the nozzle. In this case, driving the inkjet head 102 can be considered as driving a drive element (for example, a piezoelectric element) that ejects the ink from the nozzle in the same manner as at the time of the printing operation. At the time of performing flushing, not some nozzles are selected according to the image to be printed as in the printing operation, but all the nozzles in the inkjet head 102 to be maintained are selected and ink droplets are ejected from the nozzles. The flushing can also be considered as maintenance that repeats ejection of ink in units of dots. By performing flushing, the ink having a viscosity increased by drying in the vicinity of the nozzle can be discharged. Thus, the ejecting at the time of the printing operation can be stabilized. Furthermore, by eliminating the ink that has started to dry in the vicinity of the nozzle, it is also possible to prevent the nozzle from being clogged due to the progress of drying.

The wipe is maintenance performed without consuming ink by wiping the nozzle surface of the inkjet head 102. In the present example, the maintenance unit 114 performs wiping on the nozzle surface of the inkjet head 102 using a wiper moistened with cleaning water to execute wiping. In a modification of the operation of the wipe, it is also conceivable to use a cleaning liquid containing a cleaning agent instead of the cleaning water. As such a cleaning liquid, a known cleaning liquid for an inkjet head can be suitably used. As the known cleaning liquid, for example, it is conceivable to use the cleaning liquid disclosed in Japanese Unexamined Patent Publication No. 2009-155424 or the cleaning liquid disclosed in Japanese Unexamined Patent Publication No. 2020-82577. The cleaning water and the cleaning liquid used in the wipe can be considered as an example of the cleaning liquid. It is also possible to remove foreign matter (dust or the like) adhering to the nozzle surface by performing the wipe. Furthermore, by performing the wipe using cleaning water or the like, the drying of the nozzle surface can be delayed without using ink. Furthermore, by performing the wipe immediately after performing the purge, the ink flowing out to the nozzle surface by the purge can be wiped off.

Here, as can be understood from the above description, in the present example, the purge and the flushing are maintenance that consumes ink at the time of execution. The consumption amount of ink when the purge is performed is larger than that when the flushing is performed. In addition, the effect of maintenance is also greater when the purge is performed than when the flushing is performed. The effect of recovering the clogged nozzle can be considered as an expected effect particularly in the purge. Therefore, the purge can be considered as maintenance that consumes more ink than the flushing although the effect is high. Furthermore, in the maintenance operation at the usual time (normal time), the maintenance unit 114 executes the purge, the flushing, and the wipe at predetermined intervals to satisfactorily maintain the state of the nozzle in the inkjet head 102. In this case, it is conceivable to execute each of the purge, the flushing, and the wipe at an interval determined according to the characteristics of the inkjet head 102 and the ink.

However, when an abnormality that the ink cannot be appropriately supplied from the main tank 106 (see FIG. 1) to the sub-tank 202 occurs due to a problem in the ink supply system 108 (see FIG. 2), it is conceivable that the ink in the sub-tank 202 may not be in a short time if the purge with a large consumption amount of ink is continued. As a result, the drying of the ink in the vicinity of the nozzle progresses, and the failure of the inkjet head 102 easily occurs. Furthermore, in the case of carrying out printing in the automated driving for a long time (for example, overnight driving) in a state where the worker is not nearby, if the ink in the sub-tank 202 runs out in the middle and the maintenance on the inkjet head 102 becomes impossible, it is considered that the trouble of the inkjet head 102 is likely to occur since it takes time until the worker notices the state.

On the other hand, in the present example, when an abnormality in which the ink cannot be appropriately supplied to the sub-tank 202 occurs and the amount of ink stored in the sub-tank 202 decreases, the maintenance controller 406 prohibits (stops) the execution of the purge, and then causes the maintenance unit 114 to continuously execute the flushing in which the consumption amount of ink is smaller than that of the purge. According to such configuration, the flushing can be appropriately executed for a longer time even if it becomes difficult to keep the nozzle in an optimum state due to not executing the purge. Thus, the failure of the inkjet head 102 due to the progress of the drying of the nozzle surface can be more appropriately prevented.

Furthermore, when the amount of ink stored in the sub-tank 202 becomes smaller, it may be difficult to execute the flushing. On the other hand, in the present example, when the amount of ink stored in the sub-tank 202 further decreases, the maintenance controller 406 prohibits the flushing in addition to the purge, and causes the maintenance unit 114 to perform the wipe. According to such configuration, even when the amount of ink in the sub-tank 202 becomes particularly small, the possible maintenance can be continuously executed.

As shown in (a) of FIG. 4, when a state in which a predetermined fully-filled amount of ink is stored in the sub-tank 202 is considered as an upper limit of the amount of ink in the sub-tank 202, and a minimum storage amount of ink for causing the maintenance unit 114 to execute the flushing is considered as a lower limit of the amount of ink in the sub-tank 202, the maintenance controller 406 determines whether to cause the maintenance unit 114 to execute the purge with reference to a predetermined threshold Vth1 set between the upper limit and the lower limit. In this case, the threshold Vth1 is an example of a first threshold, and is larger than the lower limit and smaller than the upper limit. The lower limit is an example of a second threshold smaller than the first threshold.

Furthermore, the maintenance controller 406 determines maintenance to be executed by the maintenance unit 114 for the inkjet head 102 to which ink is supplied from the sub-tank 202 for each sub-tank 202 based on the amount of ink in each sub-tank 202 detected by the ink amount detection unit 408. For example, when the amount of ink in the sub-tank 202 is equal to or larger than the threshold Vth1, the maintenance controller 406 permits the purge as maintenance to be executed on the inkjet head 102 to which ink is supplied from the sub-tank 202. Furthermore, in the present example, when the amount of ink in the sub-tank 202 is equal to or larger than the threshold Vth1, the maintenance controller 406 permits the flushing and the wipe in addition to the purge as maintenance to be executed on the inkjet head 102 to which ink is supplied from the sub-tank 202. In this case, the maintenance controller 406 causes the maintenance unit 114 to execute the purge, the flushing, and the wipe at predetermined timings. According to such configuration, the maintenance on the inkjet head 102 can be more appropriately executed when the ink is sufficiently stored in the sub-tank 202.

Furthermore, in this case, it is conceivable to wipe off the ink attached to the nozzle surface by the purge by performing the wipe immediately after performing the purge as described above. Furthermore, in this regard, considering the purpose of wiping the ink, it seems preferable to use a wiper that is not moistened with the cleaning water. However, when the wipe is performed in a state where the wiper and the nozzle surface are dried, the wipe may cause damage to the nozzle surface. Therefore, in the present example, the wiper moistened with the cleaning water is used as described above also in the wipe performed after execution of the purge. According to such configuration, the maintenance of the wipe performed immediately after the purge can be more appropriately executed.

Furthermore, when the amount of ink in the sub-tank 202 is smaller than the threshold Vth1, the maintenance controller 406 prohibits the purge as maintenance to be executed on the inkjet head 102 to which ink is supplied from the sub-tank 202. More specifically, in the present example, when the amount of ink in the sub-tank 202 becomes smaller than the threshold Vth1 and the purge is prohibited, the maintenance controller 406 permits the flushing and the wipe as maintenance to be executed on the inkjet head 102 to which ink is supplied from the sub-tank 202. As shown in the drawing, in the present example, when the amount of ink in the sub-tank 202 is smaller than the threshold Vth1 and equal to or larger than the lower limit, the maintenance controller 406 prohibits the purge and permits the flushing and the wipe as maintenance to be executed on the inkjet head 102 to which ink is supplied from the sub-tank 202. In this case, the maintenance controller 406 causes the maintenance unit 114 to perform the flushing and the wipe at predetermined timings.

Furthermore, when the ink in the sub-tank 202 further decreases and the amount of ink in the sub-tank 202 becomes smaller than the lower limit, the maintenance controller 406 further prohibits the flushing. In this case, the operation of the maintenance controller 406 can be considered as an operation of prohibiting the purge and the flushing and permitting the wipe. Furthermore, prohibiting the purge and the flushing can be considered as prohibiting maintenance that consumes ink.

According to the present example, even when the amount of ink in the sub-tank 202 becomes small and it becomes difficult to continue the purge, the maintenance on the inkjet head 102 can be appropriately continued while suppressing the consumption amount of ink by performing the flushing. In this case, the purge can be considered as maintenance to be executed only when the amount of ink in the sub-tank 202 is sufficient. Continuing the maintenance on the inkjet head 102 can be considered as performing the maintenance on the inkjet head 102 at every predetermined timing. Furthermore, by executing such maintenance on the inkjet head 102, the vicinity of the nozzle of the inkjet head 102 can be appropriately prevented from drying even when an abnormality occurs in the supply of the ink to the sub-tank 202. Thus, the maintenance to be executed on the inkjet head 102 can be more appropriately managed, and the failure of the inkjet head 102 can be more appropriately prevented.

Furthermore, in the present example, even when the ink in the sub-tank 202 further decreases and the flushing is further prohibited, the wipe is executed, so that the executable maintenance can be continued for the inkjet head 102 to which ink has been supplied from the sub-tank 202. Thus, the possibility of the inkjet head 102 failing can be more appropriately reduced.

As described above, in the present example, the ink amount detection unit 408 detects the amount of ink stored in each sub-tank 202 for each sub-tank 202. Then, the maintenance controller 406 determines the type of maintenance to be executed on the inkjet head 102 to which ink is supplied from the sub-tank 202 according to the amount of ink stored in each sub-tank 202. Thus, the maintenance controller 406 determines whether to permit the purge and the flushing for each inkjet head 102. According to such configuration, even when the amount of ink is reduced only in the sub-tank 202 corresponding to some inkjet heads 102 and the purge for the inkjet head 102 receiving the ink supply from the sub-tank 202 is prohibited, the purge can be continuously executed for the other inkjet heads 102. Furthermore, even when the amount of ink in the sub-tank 202 further decreases and the flushing with respect to the inkjet head 102 that receives the ink supply from the sub-tank 202 is prohibited, the purge and the flushing can be continuously executed with respect to the other inkjet heads 102. Therefore, according to the present example, the life of each nozzle of the plurality of inkjet heads 102 can be appropriately extended.

Here, as described above, in the present example, the sub-tank 202 stores the ink separately in the IN-side storage portion 302 (see FIG. 2) and the OUT-side storage portion 304 (see FIG. 2). Furthermore, the ink amount detection unit 408 detects a first storage amount, which is the amount of ink stored in the IN-side storage portion 302, and a second storage amount, which is the amount of ink stored in the OUT-side storage portion 304, based on the outputs of the liquid level detection sensors 306 and 308. In this case, in the actual operation of the maintenance controller 406, more specifically, the type of maintenance to be executed for each inkjet head 102 is determined based on the first storage amount and the second storage amount than the relationship between the amount of ink and the type of maintenance illustrated in a simplified manner in (a) of FIG. 4. Therefore, hereinafter, the operation of determining the type of maintenance based on the first storage amount and the second storage amount will be described more specifically.

(b) of FIG. 4 shows an example of a normal state in which a sufficient amount of ink is stored in the sub-tank 202. As described above, in the ink supply system 108 of the present example, in order to appropriately secure the ink supply performance, the performance of the pump 212 for supplying ink (see FIG. 2) is made larger than the performance of the pump 214 for circulating (see FIG. 2). Therefore, during the normal operation, the amount of ink stored in each of the IN-side storage portion 302 and the OUT-side storage portion 304 mainly transitions between the states B and C among the states A, B, and C described using FIG. 3. Therefore, in the present example, a state in which a transition occurs between the states B and C can be considered as a normal state. Such a normal state can be considered to correspond to a state in which the amount of ink in the sub-tank 202 is equal to or larger than the threshold Vth1. In this case, as shown in the drawing, the first storage amount in the IN-side storage portion 302 is an amount corresponding to Low or Middle. In addition, the second storage amount in the OUT-side storage portion 304 is a storage amount exceeding the position of the liquid level detection sensor 308. In this case, it is conceivable that the second storage amount is an amount corresponding to Limit.

As described above, when the storage amount of ink in the sub-tank 202 is in the state B, the pump controller 404 (see FIG. 3) causes the pumps 212 and 214 to perform the ink supply circulation operation. When the ink storage amount is in the state C, the pump controller 404 causes the pumps 212 and 214 to perform the ink circulation operation. Therefore, when the amount of ink in the sub-tank 202 is in a normal state, the operation of supplying ink to the IN-side storage portion 302 is an intermittent operation. Furthermore, the circulating operation of ink to return the ink from the OUT-side storage portion 304 to the main tank 106 is a continuous operation. When in such a normal state, the maintenance controller 406 causes the maintenance unit 114 to execute the purge, the flushing, and the wipe as described above with respect to the inkjet head 102 to which the ink is supplied from the sub-tank.

Figure 5:
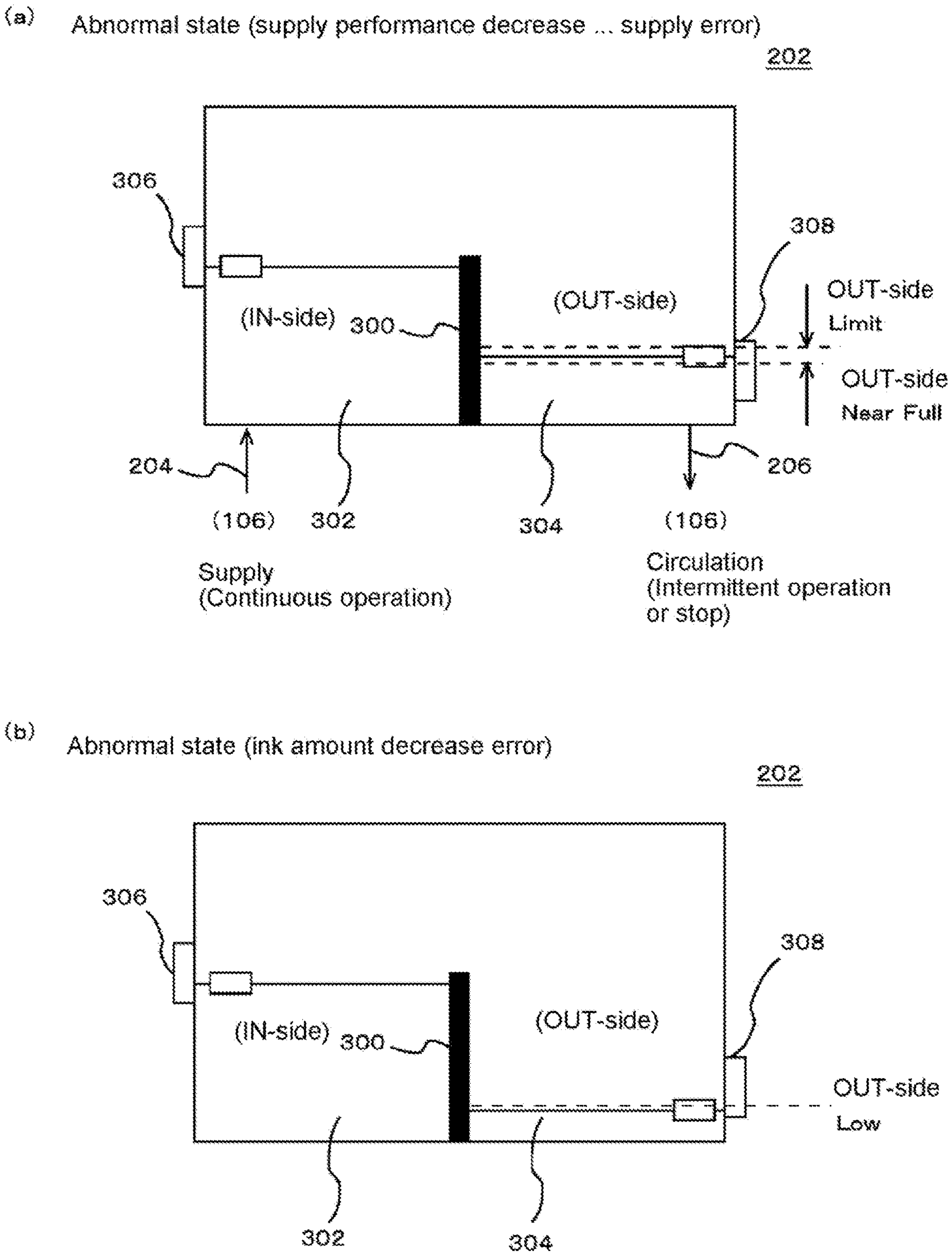
FIG. 5 shows an example of a state in which the ink in the sub-tank 202 has decreased. (a) of FIG. 5 shows an example of a state in which a supply abnormality, which is an abnormality in which the ink supply performance to the sub-tank 202 decreases, has occurred. (b) of FIG. 5 shows a state in which an ink amount decrease error in which the amount of ink in the sub-tank 202 further decreases occurs.

On the other hand, when the amount of ink in the sub-tank 202 decreases, a state as shown in FIG. 5 is obtained. FIG. 5 shows an example of a state in which the ink in the sub-tank 202 has decreased. (a) of FIG. 5 shows an example of a state in which a supply abnormality, which is an abnormality in which the ink supply performance to the sub-tank 202 decreases, has occurred. The supply abnormality can be considered as an abnormality in which the amount of ink supplied from the main tank 106 (see FIG. 1) to the sub-tank 202 is insufficient. In the present example, it is conceivable that a supply abnormality occurs due to ink end in which the ink in the main tank 106 runs out, clogging of the filter 218 (see FIG. 2), and the like.

Furthermore, in the present example, when the supply abnormality occurs and the ink flow amount from the main tank 106 to the sub-tank 202 decreases, the state of the storage amount of ink in the sub-tank 202 changes to the state A described above as the amount of ink in the IN-side storage portion 302 and the OUT-side storage portion 304 decreases. In this case, if the decrease in the ink flow amount is slight, the state of the storage amount of ink in the sub-tank 202 returns to the state B in a short time. On the other hand, in a case where the ink flow amount is more greatly reduced, it is conceivable that the time until returning to the state B becomes long or the state B cannot be returned.

Therefore, in the present example, when the state of the storage amount of ink in the sub-tank 202 does not return to the state B within a predetermined time after changing to the state A, the ink amount detection unit 408 determines that the supply abnormality has occurred. When the ink flow amount decreases, it is conceivable that the first storage amount in the IN-side storage portion 302 becomes smaller than the reference amount Li2 and the second storage amount in the OUT-side storage portion 304 becomes smaller than the reference amount Lo1 in the relationship with the reference amount (the reference amount Li2, the reference amount Lo1, and the like) described with reference to FIG. 3. In this case, when the state of the storage amount of ink in the sub-tank 202 changes to the state A, the pump controller 404 (see FIG. 3) causes the pumps 212 and 214 (see FIG. 2) to perform the ink supply operation. Then, in a case where the second storage amount does not become equal to or larger than the reference amount Lo1 even though the predetermined time elapses after the pumps 212 and 214 start the ink supply operation, the ink amount detection unit 408 determines that the supply abnormality occurs. According to the present example, the supply abnormality can be appropriately detected.

Here, as described above, even if the state of the storage amount of ink in the sub-tank 202 changes to the state A, the state of the storage amount of ink in the sub-tank 202 returns to the state B in a short time as long as the decrease in the ink flow amount is slight. Therefore, in this case, the state of the storage amount of ink transitions between the states A and B. In this case, the operation of supplying the ink to the IN-side storage portion 302 is a continuous operation. The circulating operation of the ink to return the ink from the OUT-side storage portion 304 to the main tank 106 is an intermittent operation. Further, when the ink flow amount is further decreased, the state does not return to the state B, and thus the circulating operation of the ink to return the ink from the OUT-side storage portion 304 to the main tank 106 is stopped.

As described above, the states A, B, and the like indicate the storage amount of ink in the sub-tank 202. Therefore, the operation in which the ink amount detection unit 408 detects the supply abnormality as described above can be considered as an operation of detecting a supply abnormality based on the amount of ink stored in the sub-tank 202. The operation of detecting a supply abnormality can also be considered as an operation of detecting an abnormality in the ink flow amount from the main tank 106 to the sub-tank 202. Therefore, when the second storage amount does not become equal to or larger than the reference amount Lo1 even though a predetermined time elapses after the pumps 212 and 214 start the ink supply operation, the liquid flow amount detection unit 410 may detect an abnormality in the ink flow amount. In this case, it is conceivable that the supply abnormality is determined to have occurred in the ink amount detection unit 408 by the liquid flow amount detection unit 410 detecting the ink flow amount.

Furthermore, as can be understood from the above description, in the present example, detecting the supply abnormality can be considered to correspond to detecting a state in which the amount of ink in the sub-tank 202 is smaller than a predetermined amount. In the present example, when the ink amount detection unit 408 detects the supply abnormality, the amount of ink in the sub-tank 202 can be considered to be smaller than the predetermined threshold Vth1. In this case, the threshold Vth1 of the amount of ink can be converted from the reference amount Li2 and the reference amount Lo1, which are conditions for causing the pumps 212 and 214 to start the ink supply operation, and the above-described condition of the predetermined time used for detecting the supply abnormality.

Furthermore, corresponding to such a relationship between detecting the supply abnormality and the threshold Vth1 of the amount of ink, in the present example, when the supply abnormality is detected for any of the sub-tanks 202, the maintenance controller 406 (see FIG. 3) prohibits the purge as maintenance to be executed for the inkjet head 102 (see FIG. 1) to which the ink is supplied from the sub-tank 202. According to such configuration, it is possible to appropriately prevent the ink in the sub-tank 202 from being greatly reduced by the purge being performed in the supply abnormality state.

Furthermore, when the storage amount of ink in the sub-tank 202 becomes the state A, it is also conceivable to cause the notification unit 116 (see FIG. 1) in the printing device 100 to notify an alarm of the warning at a stage before it is determined that the supply abnormality occurs after the predetermined time has elapsed. In this case, after the pumps 212 and 214 start the ink supply operation, when the second storage amount does not become equal to or larger than the reference amount Lo1 even though the elapse of the preset first time, the ink amount detection unit 408 causes the notification unit 116 to notify an alarm of a warning. After the pumps 212 and 214 start the ink supply operation, when the second storage amount does not become equal to or larger than the reference amount Lo1 even though the second time longer than the first time elapses, the ink amount detection unit 408 determines that the supply abnormality occurs. According to such configuration, the warning can be appropriately issued to the user at a stage where the decrease amount of the ink flow amount is small. Thus, the user can be prompted to inspect the ink supply system 108, replace the filter 218, and the like. In this case, the second time can be considered to correspond to the predetermined time used to detect the supply abnormality. Furthermore, at the time point the second time has elapsed, the ink amount detection unit 408 may cause the notification unit 116 to notify an alarm indicating the supply abnormality. It is also conceivable to cause the notification unit 116 to notify a warning or an alarm indicating a supply abnormality in the liquid flow amount detection unit 410.

Furthermore, as described above, in the present example, at the time point the ink amount detection unit 408 determines that the supply abnormality occurs due to the elapse of the predetermined time, the maintenance controller 406 prohibits the purge as maintenance to be executed on the inkjet head 102 to which the ink is supplied from the sub-tank 202 in which the supply abnormality has been detected. In this case, the maintenance unit 114 performs the flushing and the wipe on the inkjet head 102 as described above. However, when the ink in the sub-tank 202 further decreases as in the state illustrated in (b) of FIG. 5, as described above, the maintenance controller 406 further prohibits flushing and permits only the wipe.

(b) of FIG. 5 shows a state in which an ink amount decrease error in which the amount of ink in the sub-tank 202 further decreases from the state shown in (a) of FIG. 5 occurs. In the present example, the state in which the ink amount decrease error occurs can be considered as a state in which the amount of ink in the sub-tank 202 is smaller than the lower limit shown in (a) of FIG. 4. Furthermore, the state in which the amount of ink is smaller than the lower limit is conceivable as a state in which the amount of ink in the sub-tank 202 is smaller than the amount of ink (maintenance possible amount) in which the maintenance that consumes ink can be executed.

In the present example, the ink amount detection unit 408 determines that the ink amount decrease error has occurred at the time point the second storage amount in the OUT-side storage portion 304 becomes the amount corresponding to Low. When the ink amount decrease error occurs in any of the sub-tanks 202, the maintenance controller 406 further prohibits the flushing and permits only the wipe as maintenance to be executed on the inkjet head 102 to which the ink is supplied from the sub-tank 202. Thus, the maintenance unit 114 executes only the wipe as the subsequent maintenance on the inkjet head 102. According to such configuration, the ink in the sub-tank 202 can be appropriately prevented from further decreasing.

As described above, according to the present example, the type of maintenance permitted to be executed can be appropriately changed according to the state where the amount of ink in the sub-tank 202 has decreased or the error occurrence state corresponding thereto. As described above, at the normal time when the amount of ink is sufficient in the sub-tank 202, the maintenance controller 406 permits the purge, the flushing, and the wipe as maintenance to be executed on the inkjet head 102 to which the ink is supplied from the sub-tank 202. Furthermore, when the ink in the sub-tank 202 decreases due to the supply abnormality, the maintenance controller 406 prohibits the purge and permits the flushing and the wipe as maintenance to be executed on the inkjet head 102 to which the ink is supplied from the sub-tank 202. Furthermore, when the ink in the sub-tank 202 further decreases and an ink amount decrease error occurs, the maintenance controller 406 further prohibits the flushing and permits only the wipe as maintenance to be executed on the inkjet head 102 to which the ink is supplied from the sub-tank 202. According to the present example, even when the amount of ink in the sub-tank 202 decreases, the executable maintenance can be continuously executed. Thus, the failure of the inkjet head 102 can be made less likely to occur.

As described above, in the present example, the ink amount detection unit 408 detects the amount of ink in the sub-tank 202 for each sub-tank 202. Thus, the maintenance controller 406 determines the type of maintenance to be executed on the inkjet head 102 to which the ink is supplied from each sub-tank 202 according to the amount of ink in each sub-tank 202.

In this regard, considering simpler control of the maintenance, it is conceivable to stop the maintenance operation for all the inkjet heads 102 and uniformly determine the maintenance to be executed for all the inkjet heads 102 when the amount of ink decreases only in some of the sub-tanks 202. However, if the maintenance operation is stopped for all the inkjet heads 102, the ink solidifies in the inkjet head 102 or on the nozzle surface, and all the inkjet heads 102 will fail. Furthermore, in a case where the maintenance to be executed is uniformly determined for all the inkjet heads 102, when the amount of ink decreases in some of the sub-tanks 202, the purge and the flushing may be prohibited and only the wipe may be performed for the inkjet head 102 corresponding to the sub-tank 202 in which a sufficient amount of ink is stored. However, in the case of performing only the wipe as maintenance operation, the effect of the maintenance becomes smaller than the case of performing the purge or the flushing, and thus the failure of the inkjet head 102 easily occurs. Thus, in this case as well, all the inkjet heads 102 may fail.

On the other hand, in the present example, the amount of ink in the sub-tank 202 is individually detected for each sub-tank 202, and the type of maintenance to be executed on the inkjet head 102 corresponding to each sub-tank 202 is determined for each inkjet head 102, so that even when the amount of ink decreases in some sub-tanks 202, the purge can be continuously performed on the inkjet head 102 corresponding to another sub-tank 202 in which the amount of ink is normal. In this case, as described above, the flushing can be continuously executed until the amount of ink becomes smaller than the lower limit with respect to the inkjet head 102 corresponding to the sub-tank 202 in which the amount of ink becomes small. Therefore, according to the present example, in the configuration using the plurality of sub-tanks 202 and the plurality of inkjet heads 102, the maintenance on each inkjet head 102 can be more appropriately executed.

Subsequently, supplementary explanation regarding the configuration described above and description of modifications will be made. As described above, in the present example, the maintenance controller 406 determines the maintenance to be executed for each inkjet head 102 according to the amount of ink stored in each sub-tank 202. In this case, with respect to the printing operation executed in the printing device 100, it is conceivable that the amount of ink decreases in any one of the sub-tanks 202, and the printing operation is stopped at the time point where the purge is prohibited as maintenance on any one of the inkjet heads 102. According to such configuration, an unexpected situation can be appropriately prevented from occurring by continuing the printing operation in the state where the abnormality occurs. Furthermore, in this case, after stopping the operation of printing, the printing device 100 waits for the user's instruction and countermeasure while periodically performing the executable maintenance on each inkjet head 102. According to such configuration, the maintenance executed on the inkjet head 102 corresponding to the sub-tank 202 in which the amount of stored ink is small is made different from the normal time, so that the maintenance can be continued for a longer time. Thus, the inkjet head 102 can be appropriately prevented from failing due to drying of the nozzle after stopping the printing operation.

Furthermore, in a modification of the operation of the printing device 100, it is conceivable to stop the printing operation at the time point the flushing with respect to the inkjet head 102 is prohibited without stopping the printing operation at the time point the purge with respect to the inkjet head 102 corresponding to any sub-tank 202 is prohibited. According to such configuration, the printing operation can be continued for a longer time even if the supply abnormality or the like occurs in any of the sub-tanks 202. Furthermore, in another modification of the operation of the printing device 100, it is also conceivable to continue the printing operation using only the inkjet head 102 corresponding to another sub-tank 202 when the amount of ink decreases only in some sub-tanks 202.

Furthermore, when the amount of ink decreases in any sub-tank 202, it is also conceivable to change the frequency of flushing to be executed thereafter, instead of simply prohibiting the purge. In this case, the frequency of flushing can be considered as the number of times of flushing per unit time. When the purge with respect to the inkjet head 102 corresponding to the sub-tank 202 is prohibited due to the decrease in the amount of ink in the sub-tank 202, the frequency of flushing to be executed subsequently with respect to the inkjet head 102 may be made lower than the frequency of flushing to be executed with respect to the inkjet head 102 corresponding to the sub-tank 202 in which the supply abnormality does not occur. According to such configuration, when the supply abnormality occurs in any of the sub-tanks 202, the consumption amount of ink in the sub-tank 202 can be more appropriately reduced. Furthermore, in this case, it is conceivable to set the frequency of flushing executed for the inkjet head 102 corresponding to the sub-tank 202 in which the supply abnormality occurs to the minimum necessary number of times, which is the minimum number of times necessary to maintain the performance of the nozzle in the inkjet head 102, per unit time. Furthermore, such a configuration can also be considered as a configuration in which the minimum required number of times of flushing per unit time is determined in advance, and the number of times of flushing per unit time is forcibly changed to the minimum required number when the amount of ink in the sub-tank 202 falls below the threshold.

Furthermore, in another modification of the configuration of the printing device 100, when the amount of ink decreases in any sub-tank 202, it is also conceivable to reduce the frequency of the purge before prohibiting the purge. In this case, the maintenance controller 406 first reduces the number of times of purge executed per unit time for the inkjet head 102 corresponding to the sub-tank 202 according to the decrease in the amount of ink in the sub-tank 202. When the amount of ink in the sub-tank 202 further decreases, the purge of the inkjet head 102 is prohibited.

As described above, in the present example, the purge is an example of normal maintenance. Flushing is an example of low-consumption maintenance. However, in a modification of the configuration of the printing device 100 or in a case where the viewpoint for each maintenance is different, the relationship between each maintenance and the normal maintenance and the low-consumption maintenance can be considered to be different from the above. For example, when focusing on the relationship between the flushing and the wipe, the flushing can be considered as normal maintenance, and the wipe can be considered as low-consumption maintenance. The maintenance controller 406 can also be considered as a control means related to normal maintenance. In this case, the control means related to the normal maintenance can be considered as a means that prohibits the normal maintenance on the nozzle in the inkjet head 102 to which the ink is supplied from the sub-tank 202 in which the remaining amount of ink is determined to be less than the threshold, and permits the normal maintenance on the nozzle in the inkjet head 102 to which the ink is supplied from the sub-tank 202 having the remaining amount of ink equal to or larger than the threshold.

In the description made above, the configuration in the case of ejecting the ink on the medium has been mainly described for the printing device 100. In this case, the printing device 100 can be considered as an inkjet printer that draws a two-dimensional image on a medium. On the other hand, in a modification of the configuration of the printing device 100, it is also conceivable to use a 3D printer (3D printing device) that forms a stereoscopic forming object as the printing device 100. Furthermore, in this case, a forming table that supports a forming object being formed and the forming object being formed can be considered as a target for ejecting the ink. In this case as well, the maintenance to be executed for each inkjet head 102 can be more appropriately managed by determining the maintenance to be executed for each inkjet head 102 in the same manner as described above.

Next, a method of detecting the ink flow amount in the liquid flow amount detection unit 410 and an operation of causing the notification unit 116 (see FIG. 1) to notify an alarm will be described in more detail. As described above, in the present example, the liquid flow amount detection unit 410 determines the presence or absence of an abnormality in the ink flow amount from the main tank 106 to the sub-tank 202, and causes the notification unit 116 to notify an alarm when the abnormality occurs. In this case, according to the operation shown in the flowchart in FIG. 6, the liquid flow amount detection unit 410 detects the ink flow amount based on the operation state of the pumps 212 and 214 controlled by the pump controller 404 and the first storage amount and the second storage amount detected by the ink amount detection unit 408.

Then, the notification unit 116 is caused to perform a stepwise alarm in at least two stages according to the ink flow amount.

Figure 6:
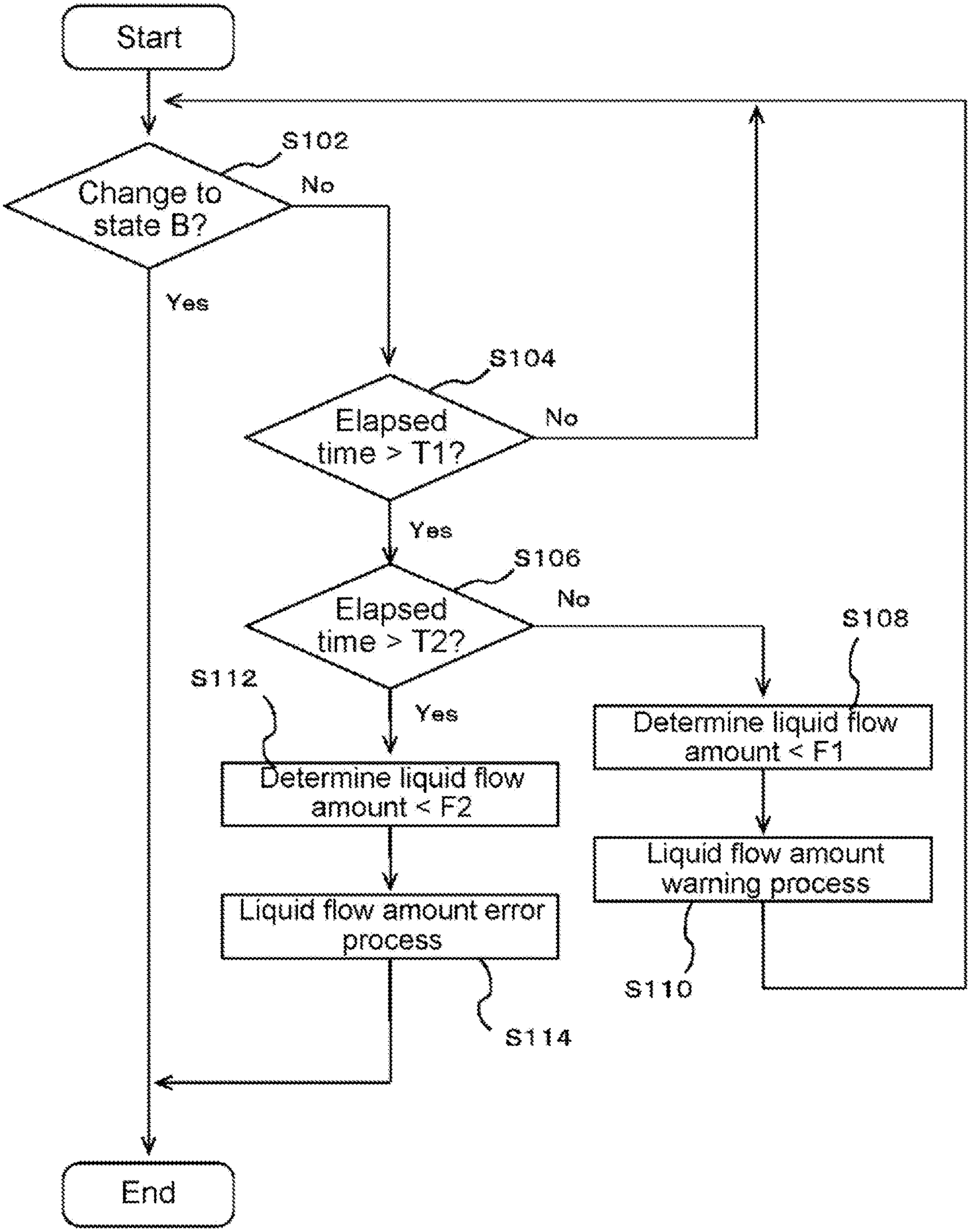
FIG. 6 is a flowchart illustrating an example of an operation of a liquid flow amount detection unit 410.

FIG. 6 is a flowchart showing an example of the operation of the liquid flow amount detection unit 410, and shows an example of the operation of the liquid flow amount detection unit 410 after the storage amount of ink in the sub-tank 202 becomes the state A. In the present example, when the ink flow amount from the main tank 106 to the sub-tank 202 decreases, the liquid flow amount detection unit 410 first causes the notification unit 116 to notify the alarm of the warning level. Then, when the ink flow amount further decreases, the notification unit 116 is caused to notify an alarm of the error level. In this case, the alarm of the warning level is an example of a first alarm indicating an abnormality of the ink flow amount in a state where the supply of ink from the main tank 106 to the sub-tank 202 can be continued. The alarm of the warning level can also be considered as an alarm that calls user's attention during the continuation of the printing operation. Furthermore, the alarm of the error level is an example of a second alarm indicating that the ink flow amount has reached a state where the supply of ink from the main tank 106 to the sub-tank 202 should be stopped. The alarm of the error level can also be considered as an alarm indicating an inoperative state of the printing device 100 (see FIG. 1) or an alarm to be notified when stopping (interrupting) the ink supply to the sub-tank 202.

As described above, during the normal operation in the present example, the state of the storage amount of ink in the sub-tank 202 mainly transitions between the states B and C described above. However, when the ink flow amount from the main tank 106 to the sub-tank 202 decreases due to clogging or the like of the filter 218 (see FIG. 2) in the supply flow path 204 (see FIG. 2), the state of the storage amount of ink in the sub-tank 202 changes to the state A. In this case, if the decrease in the ink flow amount is slight, the state of the storage amount of ink in the sub-tank 202 returns to the state B in a short time. On the other hand, in a case where the ink flow amount is more greatly reduced, it is conceivable that the time until returning to the state B becomes long or the state B cannot be returned. Therefore, in the present example, when the storage amount of ink in the sub-tank 202 becomes the state A, the liquid flow amount detection unit 410 detects the ink flow amount based on the elapsed time thereafter.

In the operation of the flowchart shown in FIG. 6, the liquid flow amount detection unit 410 confirms whether there is a change to the state B at a time point when a predetermined time elapses after the state A is reached (S102). In the present example, as can be understood from the matter shown in (b) of FIG. 3, the change from the state A to the state B can be considered to correspond to that the second storage amount in the sub-tank 202 becomes equal to or larger than the reference amount Lo1. When it is determined in step S102 that there is a change from the state A to the state B (S102: Yes), the liquid flow amount detection unit 410 ends the operation of detecting the ink flow amount.

When it is determined in step S102 that the state has not changed to the state B (S102: No), the elapsed time from the state A is compared with preset times T1 and T2 (S104, S106). In this case, the time T1 is an example of the first time. The time T2 is an example of the second time longer than the first time. The elapsed time from the state A can be considered as the time after the pumps 212 and 214 start the ink supply operation according to the control of the pump controller 404. In this comparison, when the elapsed time has not reached the first time T1 (S104: No), the process returns to step S102, and the subsequent operations are repeated.

In this comparison, when the elapsed time exceeds the time T1 (S104: Yes) and does not reach the time T2 (S106: No), the liquid flow amount detection unit 410 determines that the ink flow amount is smaller than a first threshold F1 (S108). Based on this determination, the liquid flow amount detection unit 410 executes a liquid flow amount warning process, which is a process performed when the ink flow amount decreases to a warning level (S110). In the present example, the liquid flow amount detection unit 410 causes the notification unit 116 to notify an alarm of a warning level as the liquid flow amount warning process. Furthermore, in the present example, the printing device 100 continues the printing operation even after the alarm of the warning level is notified. Therefore, after performing the liquid flow amount warning process, the liquid flow amount detection unit 410 returns to step S102 and repeats the subsequent operations.

Furthermore, in the comparison in steps S104 and S106, when the elapsed time exceeds the time T2 (S106: Yes), the liquid flow amount detection unit 410 determines that the ink flow amount is smaller than a second threshold F2 (S112). In this case, the second threshold F2 is a threshold set to a value smaller than the first threshold F1. Based on this determination, the liquid flow amount detection unit 410 executes a liquid flow amount error process which is a process performed when the ink flow amount decreases to an error level (S114). In the present example, the liquid flow amount detection unit 410 causes the notification unit 116 to notify an alarm of an error level as the liquid flow amount error process, and further stops the printing operation of the printing device 100. Thus, the liquid flow amount detection unit 410 stops the supply of ink from the main tank 106 to the sub-tank 202. Then, the liquid flow amount detection unit 410 ends the operation of the illustrated flowchart.

When configured in such manner, the ink flow amount can be appropriately detected based on the elapsed time after the storage amount of ink in the sub-tank 202 becomes the state A. Furthermore, by detecting the magnitude relationship between the two types of thresholds F1 and F2 and the ink flow amount, the notification unit 116 can be caused to appropriately notify a stepwise alarm. In addition, this makes it possible to notify an alarm according to the magnitude of the occurring problem and call for a user's response before a large problem occurs. Therefore, according to the present example, when an abnormality occurs in the supply of ink from the main tank 106 to the inkjet head 102 (see FIG. 1) performed via the sub-tank 202, the notification to the user can be appropriately performed. Thus, it is possible to more flexibly and appropriately cope with the abnormality of the ink supply. In addition, before the printing device becomes inoperable, it is possible to more reliably and appropriately urge the user to take measures to avoid the occurrence of problems and to prevent the spread of damage.

As described above, in the present example, the liquid flow amount detection unit 410 stops the supply of ink from the main tank 106 to the sub-tank 202 during the liquid flow amount error process. According to such configuration, the occurrence of unexpected damage and the spread of damage can be prevented, and the safety of the operation of the printing device 100 can be more appropriately enhanced. In this case, it is possible to appropriately prevent damage and spread of damage to the device related to the ink supply to the sub-tank 202. Accordingly, it is possible to appropriately prevent occurrence of a defect relating to the sub-tank 202.

Subsequently, supplementary explanation regarding the configuration described above and description of modifications will be made. As described above, in the present example, the printing device 100 has each configuration of the sub-tank 202 used to supply ink from the main tank 106 to the inkjet head 102 for each color of ink. Therefore, in the present example, the liquid flow amount detection unit 410 detects the ink flow amount for each sub-tank 202 corresponding to the ink of each color. Further, when an abnormality occurs in the ink flow amount corresponding to any one of the sub-tanks 202, the liquid flow amount detection unit 410 causes the notification unit 116 to issue an alarm in association with the sub-tank 202 in which the abnormality occurs in the ink flow amount. In this case, it is conceivable that the notification unit 116 issues an alarm while indicating the sub-tank 202 in which the abnormality occurs.

Furthermore, in the present example, clogging of the filter 218 in the supply flow path 204 and the like can be considered as a cause of the decrease in the ink flow amount. Therefore, detecting an abnormality in the ink flow amount in the supply flow path 204 can also be considered as detecting an abnormality in the flow rate of ink passing through the filter 218 per unit time. Furthermore, in this case, by causing the notification unit 116 to notify a stepwise alarm, it is possible to urge the user to take measures such as replacement of the filter 218 before the filter 218 is completely clogged and becomes inoperable. Furthermore, in this regard, when the filter 218 is completely clogged and becomes inoperable, not only the printing operation cannot be executed, but also the maintenance operation (cleaning) such as purge and flushing cannot be performed by the maintenance unit 114 (see FIG. 1). As a result, the inkjet head 102 may be damaged. On the other hand, according to the present example, the damage of the inkjet head 102 can be appropriately prevented by detecting the abnormality of the ink flow amount before the printing device 100 becomes inoperable due to clogging of the filter 218 or the like.

In addition to clogging of the filter 218, for example, leakage of ink due to breakage of a tube constituting the supply flow path 204, a failure in which ink cannot be supplied to the sub-tank 202 due to a failure of the pump 212, and the like can be considered as the cause of the decrease in the ink flow amount. In addition, it is also conceivable that a failure of the liquid level detection sensors 306 and 308 causes a state of erroneous detection in which correct detection cannot be performed even though ink can be actually supplied to the sub-tank 202. On the other hand, according to the present example, even in a case where the deviation from the control range occurs due to various causes as described above, it is possible to appropriately notify the alarm and urge the user to respond.

Furthermore, as described above, it is conceivable to use an ink container capable of replenishing ink as the main tank 106. Furthermore, the pressure inside the sub-tank 202 is adjusted so that the ink can be supplied to the inkjet head 102 at an appropriate ink pressure as described above. However, if the amount of ink in the sub-tank 202 decreases due to the consumption of ink in the inkjet head 102, the space inside the sub-tank 202 relatively increases, and the negative pressure value may increase. In this case, the space inside the sub-tank 202 may be released to the atmosphere in order to adjust the pressure to an appropriate pressure. In this case, it is also conceivable that deterioration of the ink occurs due to the influence of the ink coming into contact with the air, and clogging of the filter 218 easily occurs. Furthermore, as in the present example, in the configuration in which the ink is circulated between the main tank 106 and the sub-tank 202, it is conceivable that clogging of the filter 218 easily occurs as the ink repeatedly passes through the filter 218. On the other hand, according to the present example, as described above, it is possible to urge the user to take measures such as replacement of the filter 218 before the filter 218 is completely clogged and becomes inoperable. Therefore, according to the present example, even when using a configuration in which clogging of the filter 218 is likely to occur, occurrence of a major problem such as damage of the inkjet head 102 can be more appropriately prevented.

The operation performed when an abnormality in the ink flow amount is detected is not limited to the operation described above, and various changes can be made. For example, in the case of the operation shown in the flowchart of FIG. 6, the liquid flow amount detection unit 410 causes the notification unit 116 to notify the alarm of the warning level when determining that the ink flow amount is smaller than the first threshold F1 and equal to or larger than the second threshold F2. Therefore, when the ink flow amount decreases, the liquid flow amount detection unit 410 causes the notification unit 116 to notify only one of the warning level and the error level according to the ink flow amount. On the other hand, in a modification of the operation when the abnormality of the ink flow amount occurs, the liquid flow amount detection unit 410 may cause the notification unit 116 to notify both the alarms of the warning level and the error level, for example, when the ink flow amount becomes smaller than the second threshold F2.

It is also conceivable to perform various operations other than the operations described above at the time of executing the liquid flow amount warning process and the liquid flow amount error process. For example, in a case where the liquid flow amount detection unit 410 detects the presence or absence of an abnormality in the ink flow amount and the liquid flow amount detection unit 410 detects that the ink flow amount is abnormal, it is also conceivable to reduce the amount of ink (ink supply amount) supplied from the main tank 106 to the sub-tank 202 so that the flow rate of the ink passing through the filter 218 decreases. In this case, reducing the amount of ink supplied from the main tank 106 to the sub-tank 202 can be considered as reducing the set amount of ink to flow into the supply flow path 204 by the pump 212. According to such configuration, when an abnormality occurs in the ink flow amount due to clogging of the filter 218, an amount of ink that cannot pass through the filter 218 can be appropriately prevented from being supplied to the filter 218. Furthermore, it is conceivable to carry out the adjustment of the supply amount of ink while continuing the printing operation at the time of executing the liquid flow amount warning process. According to such configuration, the printing operation can be more appropriately continued even when the abnormality of the ink flow amount occurs.

Furthermore, as can be understood from the operation of the transition among the states A, B, and C described using (b) of FIG. 3, in the present example, the pump controller 404 stops the circulating operation of returning the ink from the sub-tank 202 to the main tank 106 when the amount of ink stored in the OUT-side storage portion 304 becomes smaller than a predetermined amount based on the output of the liquid level detection sensor 308. Therefore, when the ink flow amount decreases, and as a result, an abnormal state in which the amount of ink supplied to the sub-tank 202 is insufficient is formed, the pump controller 404 controls the operations of the pumps 212 and 214 so as to intermittently perform the ink circulation operation. On the other hand, in a modification of the operation when an abnormality of the ink flow amount occurs, when the liquid flow amount detection unit 410 detects that the ink flow amount is abnormal, it is conceivable to directly stop the ink circulation operation in response to the detection. Such control can also be considered as control for prohibiting an operation of returning ink from the sub-tank 202 to the main tank 106 via the circulation flow path 206 when an abnormality in the ink flow amount occurs. According to such configuration, when the amount of ink supplied from the main tank 106 to the sub-tank 202 decreases, it is possible to appropriately prevent the ink in the sub-tank 202 from losing in a short time. It is conceivable to control the circulation of the ink while continuing the printing operation at the time of executing the liquid flow amount warning process. According to such configuration, the printing operation can be more appropriately continued even when the abnormality of the ink flow amount occurs.

As described above, in the present example, the printing operation of the printing device 100 is stopped at the time of executing the liquid flow amount error process. Thus, the operation of causing the inkjet head 102 to eject the ink is stopped. On the other hand, in a modification of the operation when the abnormality of the ink flow amount occurs, it is conceivable to stop the operation of causing the inkjet head 102 to eject the ink also at the time of executing the liquid flow amount warning process. In this case, the liquid flow amount detection unit 410 stops the operation of causing the inkjet head 102 corresponding to the sub-tank 202 to eject the ink in response to detecting the abnormality of the ink flow amount to any sub-tank 202. According to such configuration, the ink in the sub-tank 202 and the inkjet head 102 can be appropriately prevented from running out by continuing the printing operation in the state where the abnormality of the ink flow amount occurs. Further, due to this, even when an abnormality occurs in the ink flow amount, it is possible to appropriately prevent the inkjet head 102 and the printing device 100 from failing.

Furthermore, as described above, in the present example, the magnitude relationship between the first and second thresholds F1 and F2 and the ink flow amount is determined by comparing the elapsed time from the state A with the preset times T1 and T2. In the above description, the manner of detecting the ink flow amount has been mainly described with respect to the operation of determining the ink flow amount based on the outputs of the liquid level detection sensors 306 and 308 in the sub-tank 202 and the operation states of the pumps 212 and 214. According to such configuration, the detection of the ink flow amount can be appropriately performed at low cost. However, the manner of detecting the ink flow amount is not limited to the above, and various changes can be made. For example, it is conceivable to install a liquid amount sensor in the supply flow path 204 and detect the ink flow amount based on the output of the liquid amount sensor. According to such configuration, the ink flow amount can be appropriately detected with high accuracy.

Furthermore, it is also conceivable that the ink flow amount gradually changes with the lapse of time. For example, when the ink flow amount decreases due to clogging of the filter 218, it is conceivable that the ink flow amount gradually decreases according to the operation time of the printing device 100. On the other hand, in the present example, as described above, the history of the ink flow amount is stored in the storage unit 412. In this case, it is conceivable that the liquid flow amount detection unit 410 detects the occurrence of an abnormality in the ink flow amount based on the history of the ink flow amount. Furthermore, in this case, it is conceivable to further utilize the history of the ink flow amount in addition to detecting the ink flow amount by the method described above. According to such configuration, the abnormality of the ink flow amount can be more appropriately detected. Furthermore, in this case, it is conceivable that the liquid flow amount detection unit 410 compares the initial value of the ink flow amount with the current ink flow amount, and detects an abnormality in the ink flow amount based on a change in the ink flow amount in time series, and the like.

Furthermore, in this case, for example, it is conceivable to setting a threshold used to determine the abnormality of the ink flow amount based on the past ink flow amount in the state where the ink flow amount is in a normal state. In this case, it is conceivable to set the threshold of the ink flow amount based on the ink flow amount at the time of shipment of the printing device 100, at the time of maintenance, at the start of the printing operation in the printing device 100, or the like. Furthermore, when an abnormality in the ink flow amount is detected by the same or similar operation as the flowchart illustrated in FIG. 6, it is also conceivable to set the times T1 and T2 to be compared with the elapsed time from the state A based on the history of the ink flow amount.

In the description made above, the configuration in the case of ejecting the ink on the medium has been mainly described for the printing device 100. In this case, the printing device 100 can be considered as an inkjet printer that draws a two-dimensional image on a medium. On the other hand, in a modification of the configuration of the printing device 100, it is also conceivable to use a 3D printer (3D printing device) that forms a stereoscopic forming object as the printing device 100. Furthermore, in this case, a forming table that supports a forming object being formed and the forming object being formed can be considered as a target for ejecting the ink. In this case as well, by notifying the alarm in the same manner as described above, it is possible to more flexibly and appropriately cope with the abnormality of the ink supply.

INDUSTRIAL APPLICABILITY

The present invention can be suitably used in a printing device.

The invention claimed is:

1. A printing device that performs printing through an inkjet method, the printing device comprising:

an inkjet head that ejects ink supplied from an ink container that stores ink;

a sub-tank that is a container that stores ink in a middle of an ink supply path from the ink container to the inkjet head;

an ink amount detection unit that detects an amount of ink stored in the sub-tank; and a maintenance determination unit that determines a type of maintenance to be executed on the inkjet head, wherein a type of maintenance determined by the maintenance determination unit includes at least a normal maintenance which is a maintenance executed when no abnormality occurs in an amount of ink stored in the sub-tank, and a low-consumption maintenance which is a maintenance in which a consumption amount of ink is smaller than that at a time of executing the normal maintenance, when an amount of ink in the sub-tank detected by the ink amount detection unit is a first threshold or more, the maintenance determination unit permits the normal maintenance as maintenance to be executed on the inkjet head to which ink is supplied from the sub-tank, when an amount of ink in the sub-tank detected by the ink amount detection unit is smaller than the first threshold, the maintenance determination unit prohibits the normal maintenance and permits the low-consumption maintenance as maintenance to be executed on the inkjet head to which ink is supplied from the sub-tank, and wherein a type of maintenance determined by the maintenance determination unit further includes a non-consumption maintenance of performing maintenance of the inkjet head without consuming ink, when an amount of ink in the sub-tank detected by the ink amount detection unit is smaller than the first threshold and is equal to or larger than a second threshold smaller than the first threshold, the maintenance determination unit prohibits the normal maintenance and permits the low-consumption maintenance as maintenance to be executed on the inkjet head to which ink is supplied from the sub-tank, and when an amount of ink in the sub-tank detected by the ink amount detection unit is smaller than the second threshold, the maintenance determination unit prohibits the normal maintenance and the low-consumption maintenance and permits the non-consumption maintenance as maintenance to be executed on the inkjet head to which ink is supplied from the sub-tank.

2. The printing device as set forth in claim 1, wherein a plurality of the inkjet heads that eject inks of different colors; and a plurality of the sub-tanks each storing ink to be supplied to each of the inkjet heads, wherein the ink amount detection unit detects an amount of ink stored in each of the sub-tanks, and the maintenance determination unit determines whether to permit the normal maintenance of each of the inkjet heads by determining a type of maintenance to be executed on the inkjet head to which ink is supplied from the sub-tank according to an amount of ink stored in each of the sub-tanks.

3. The printing device as set forth in claim 1, wherein the normal maintenance is a maintenance of performing purge of continuously ejecting ink from a nozzle of the inkjet head, and the low-consumption maintenance is a maintenance of performing flushing for ejecting ink droplets from nozzles of the inkjet head.

4. The printing device as set forth in claim 1, wherein the ink amount detection unit further detects a supply abnormality which is an abnormality in which an amount of ink supplied from the ink container to the sub-tank is insufficient based on an amount of ink stored in the sub-tank, and the maintenance determination unit prohibits the normal maintenance as maintenance to be executed on the inkjet head to which ink is supplied from the sub-tank in which the supply abnormality is detected.

5. The printing device as set forth in claim 4, further comprising:

a supply flow path that is a flow path through which ink supplied from the ink container to the sub-tank flows;

a circulation flow path that is a flow path through which ink to be returned from the sub-tank to the ink container flows;

a supply pump that is a pump that causes ink supplied from the ink container to the sub-tank to flow through the supply flow path;

a circulation pump that is a pump that causes ink returned from the sub-tank to the ink container to flow through the circulation flow path; and a pump controller that controls operations of the supply pump and the circulation pump based on an amount of ink detected by the ink amount detection unit, wherein the sub-tank includes:

a first ink storage portion that is an ink storage portion connected to the ink container via the supply flow path; and a second ink storage portion that is an ink storage portion connected to the ink container via the circulation flow path, and is partitioned from the first ink storage portion by a partition wall to supply ink overflowing the partition wall from the first ink storage portion, the ink amount detection unit detects a first storage amount which is an amount of ink stored in the first ink storage portion and a second storage amount which is an amount of ink stored in the second ink storage portion, when the first storage amount is smaller than a first reference amount and the second storage amount is smaller than a second reference amount, the pump controller causes the supply pump and the circulation pump to perform an ink supply operation that is an operation in which ink is supplied from the ink container to the sub-tank via the supply flow path and ink is not returned from the sub-tank to the ink container via the circulation flow path, and when the second storage amount does not become equal to or larger than the second reference amount even though a lapse of a predetermined time after the supply pump and the circulation pump start the ink supply operation, the ink amount detection unit determines that the supply abnormality has occurred.

6. An ink supply device that supplies ink from an ink container that stores ink to an inkjet head, the ink supply device comprising:

a sub-tank that is a container that stores ink in a middle of an ink supply path from the ink container to the inkjet head;

an ink amount detection unit that detects an amount of ink stored in the sub-tank; and a maintenance determination unit that determines a type of maintenance to be executed on the inkjet head, wherein a type of maintenance determined by the maintenance determination unit includes at least a normal maintenance which is a maintenance executed when no abnormality occurs in an amount of ink stored in the sub-tank, and a low-consumption maintenance which is a maintenance in which a consumption amount of ink is smaller than that at a time of executing the normal maintenance, when an amount of ink in the sub-tank detected by the ink amount detection unit is a first threshold or more, the maintenance determination unit permits the normal maintenance as maintenance to be executed on the inkjet head to which ink is supplied from the sub-tank, when an amount of ink in the sub-tank detected by the ink amount detection unit is smaller than the first threshold, the maintenance determination unit prohibits the normal maintenance and permits the low-consumption maintenance as maintenance to be executed on the inkjet head to which ink is supplied from the sub-tank, and wherein a type of maintenance determined by the maintenance determination unit further includes a non-consumption maintenance of performing maintenance of the inkjet head without consuming ink, when an amount of ink in the sub-tank detected by the ink amount detection unit is smaller than the first threshold and is equal to or larger than a second threshold smaller than the first threshold, the maintenance determination unit prohibits the normal maintenance and permits the low-consumption maintenance as maintenance to be executed on the inkjet head to which ink is supplied from the sub-tank, and when an amount of ink in the sub-tank detected by the ink amount detection unit is smaller than the second threshold, the maintenance determination unit prohibits the normal maintenance and the low-consumption maintenance and permits the non-consumption maintenance as maintenance to be executed on the inkjet head to which ink is supplied from the sub-tank.

* * * * *